United States Patent
Go et al.

(10) Patent No.: US 12,156,198 B2
(45) Date of Patent: Nov. 26, 2024

(54) METHOD AND APPARATUS FOR TRANSMITTING/RECEIVING PHYSICAL UPLINK SHARED CHANNEL IN WIRELESS COMMUNICATION SYSTEM

(71) Applicant: LG ELECTRONICS INC., Seoul (KR)

(72) Inventors: Seongwon Go, Seoul (KR); Suckchel Yang, Seoul (KR); Jiwon Kang, Seoul (KR); Jonghyun Park, Seoul (KR); Seonwook Kim, Seoul (KR); Haewook Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 552 days.

(21) Appl. No.: 17/593,841

(22) PCT Filed: Mar. 25, 2020

(86) PCT No.: PCT/KR2020/004054
§ 371 (c)(1),
(2) Date: Sep. 24, 2021

(87) PCT Pub. No.: WO2020/197258
PCT Pub. Date: Oct. 1, 2020

(65) Prior Publication Data
US 2022/0174700 A1    Jun. 2, 2022

(30) Foreign Application Priority Data

Mar. 27, 2019  (KR) .................. 10-2019-0035145

(51) Int. Cl.
*H04W 72/1268* (2023.01)
*H04L 1/08* (2006.01)
(Continued)

(52) U.S. Cl.
CPC .......... *H04W 72/1268* (2013.01); *H04L 1/08* (2013.01); *H04L 1/1812* (2013.01);
(Continued)

(58) Field of Classification Search
CPC ......... H04W 72/1268; H04W 72/0446; H04W 72/23; H04L 1/08; H04L 1/1812;
(Continued)

(56) References Cited

U.S. PATENT DOCUMENTS

2015/0092645 A1* 4/2015 Tabet ................ H04L 1/1812
370/311
2017/0094642 A1* 3/2017 Lee .................. H04L 5/0055
(Continued)

FOREIGN PATENT DOCUMENTS

| KR | 1020130019415 | 2/2013 |
| KR | 1020150032902 | 3/2015 |
| KR | 1020190004283 | 1/2019 |

OTHER PUBLICATIONS

PCT International Application No. PCT/KR2020/004054, International Search Report dated Jul. 17, 2020, 5 pages.
(Continued)

*Primary Examiner* — Habte Mered
(74) *Attorney, Agent, or Firm* — LEE, HONG, DEGERMAN, KANG & WAIMEY

(57) ABSTRACT

A method for transmitting a physical uplink shared channel (PUSCH) by a terminal in a wireless communication system according to an embodiment of the present specification comprises the step of: receiving sounding reference signal (SRS)-related configuration information; receiving downlink control information (DCI) for scheduling a first PUSCH; transmitting the first PUSCH on the basis of the DCI; and transmitting a second PUSCH.

13 Claims, 15 Drawing Sheets

(51) Int. Cl.
*H04L 1/1812* (2023.01)
*H04L 5/14* (2006.01)
*H04L 27/26* (2006.01)
*H04W 72/0446* (2023.01)
*H04W 72/23* (2023.01)

(52) U.S. Cl.
CPC ...... *H04L 5/1469* (2013.01); *H04L 27/26025* (2021.01); *H04W 72/0446* (2013.01); *H04W 72/23* (2023.01)

(58) Field of Classification Search
CPC ............. H04L 5/1469; H04L 27/26025; H04L 1/1864; H04L 1/189; H04L 5/0051; H04L 5/0094; H04L 5/0044
See application file for complete search history.

(56) References Cited

U.S. PATENT DOCUMENTS

| | | | |
|---|---|---|---|
| 2017/0180096 A1* | 6/2017 | Kim | H04L 1/1861 |
| 2017/0289869 A1* | 10/2017 | Nogami | H04L 5/0094 |
| 2018/0302868 A1 | 10/2018 | Bhorkar et al. | |
| 2019/0159049 A1* | 5/2019 | Kim | H04B 7/0417 |
| 2019/0260520 A1* | 8/2019 | Dong | H04L 1/1887 |
| 2020/0106646 A1* | 4/2020 | Liu | H04L 25/0226 |
| 2020/0154411 A1* | 5/2020 | Liu | H04L 1/1864 |
| 2020/0204407 A1* | 6/2020 | Liu | H04L 27/261 |
| 2021/0014026 A1* | 1/2021 | Papasakellariou | H04L 1/1861 |
| 2021/0168842 A1* | 6/2021 | Liang | H04W 72/0446 |
| 2021/0226821 A1* | 7/2021 | Liu | H04W 72/0446 |
| 2022/0060997 A1* | 2/2022 | Dinan | H04L 27/18 |
| 2022/0095335 A1* | 3/2022 | Gao | H04L 5/0062 |
| 2022/0150924 A1* | 5/2022 | Gao | H04L 1/1819 |

OTHER PUBLICATIONS

Huawei et al., "Introduction of additional SRS symbols in normal UL subframe," 3GPP TSG RAN WG1 Meeting #96, R1-1901585, Feb. 25-Mar. 1, 2019, 5 pages \* cited by examiner

[FIG. 1]
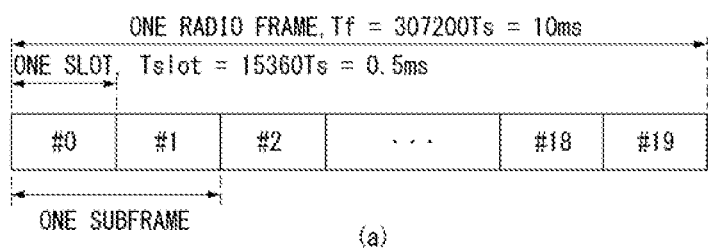
(a)
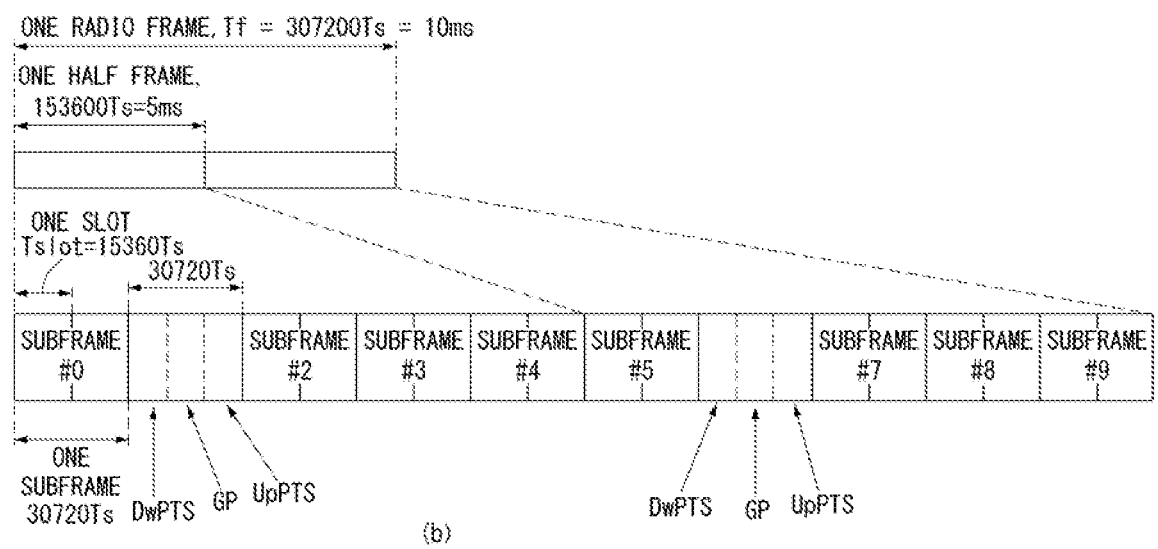
(b)

[FIG. 2]
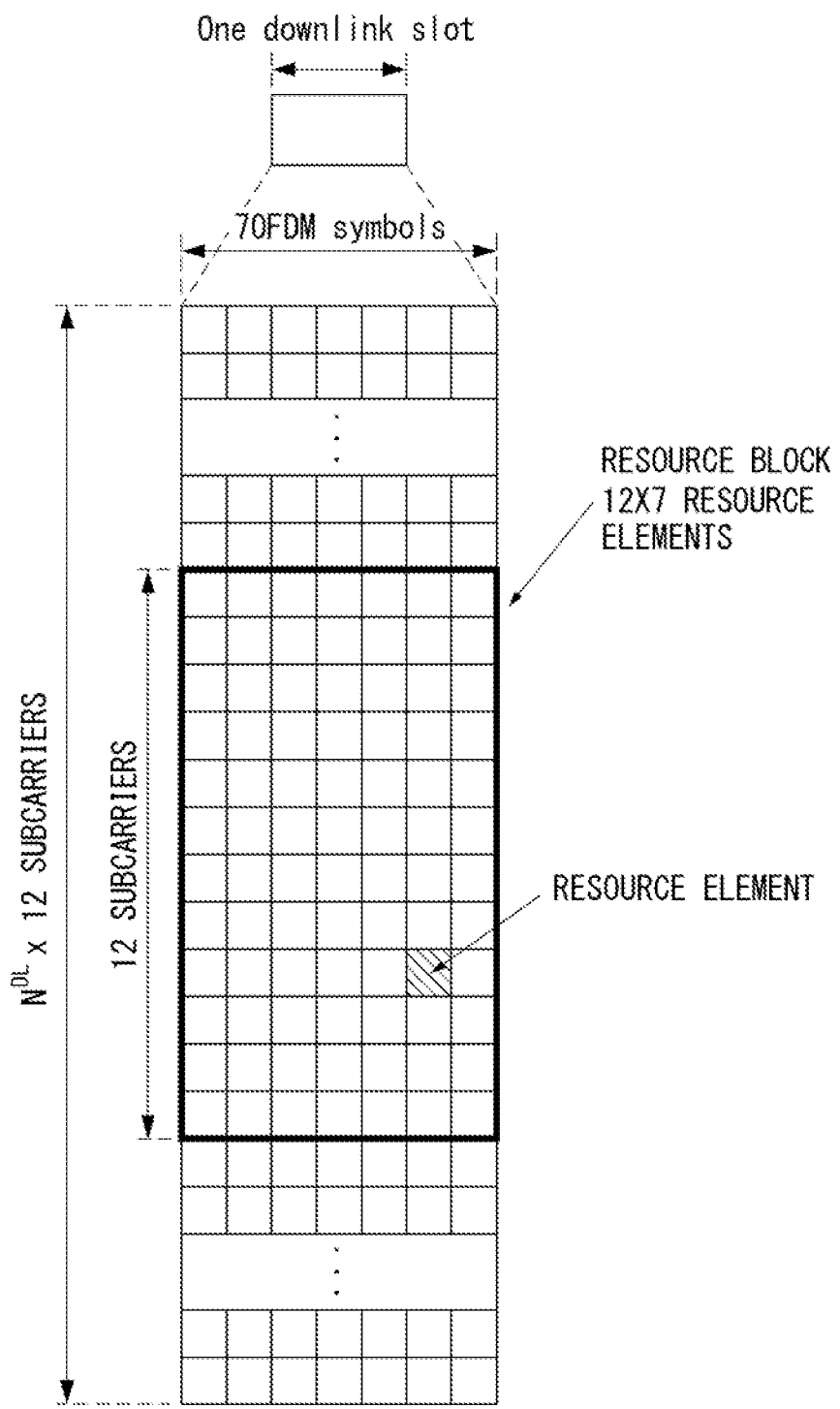

[FIG. 3]
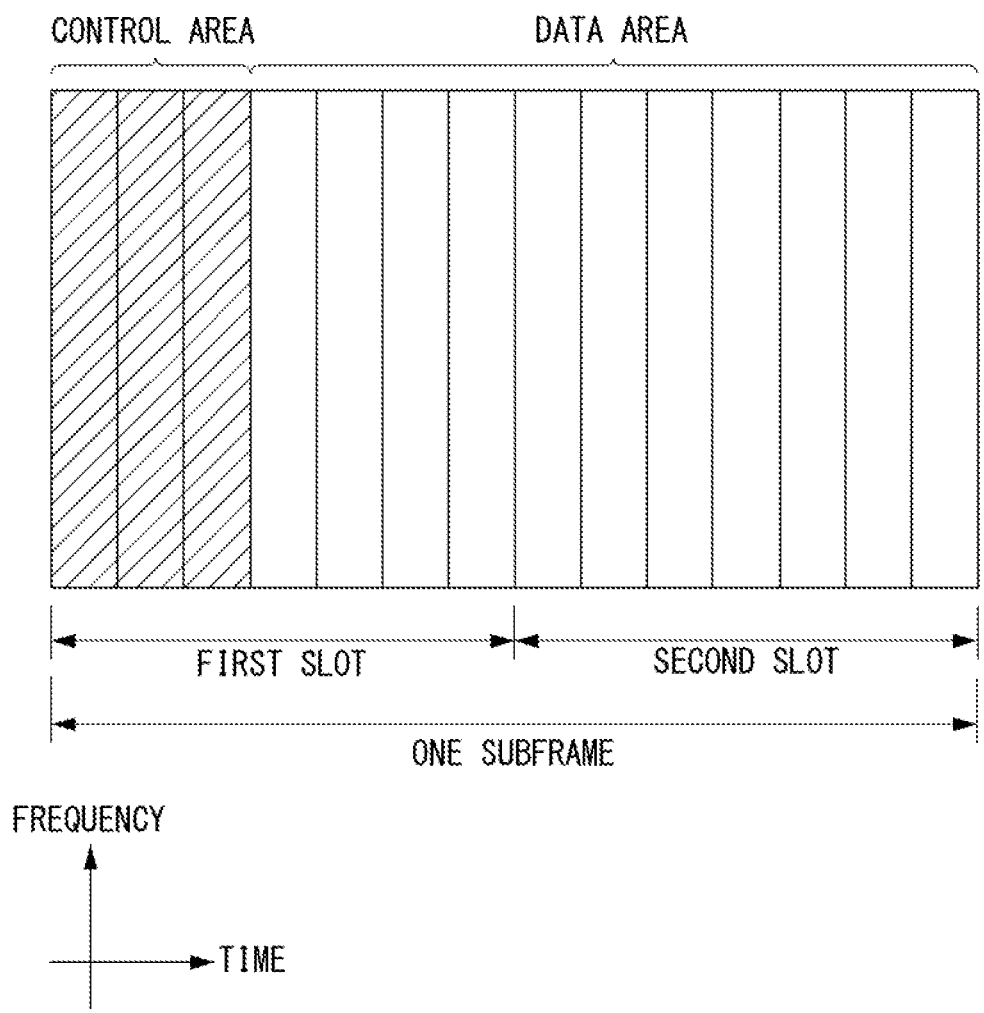

[FIG. 4]
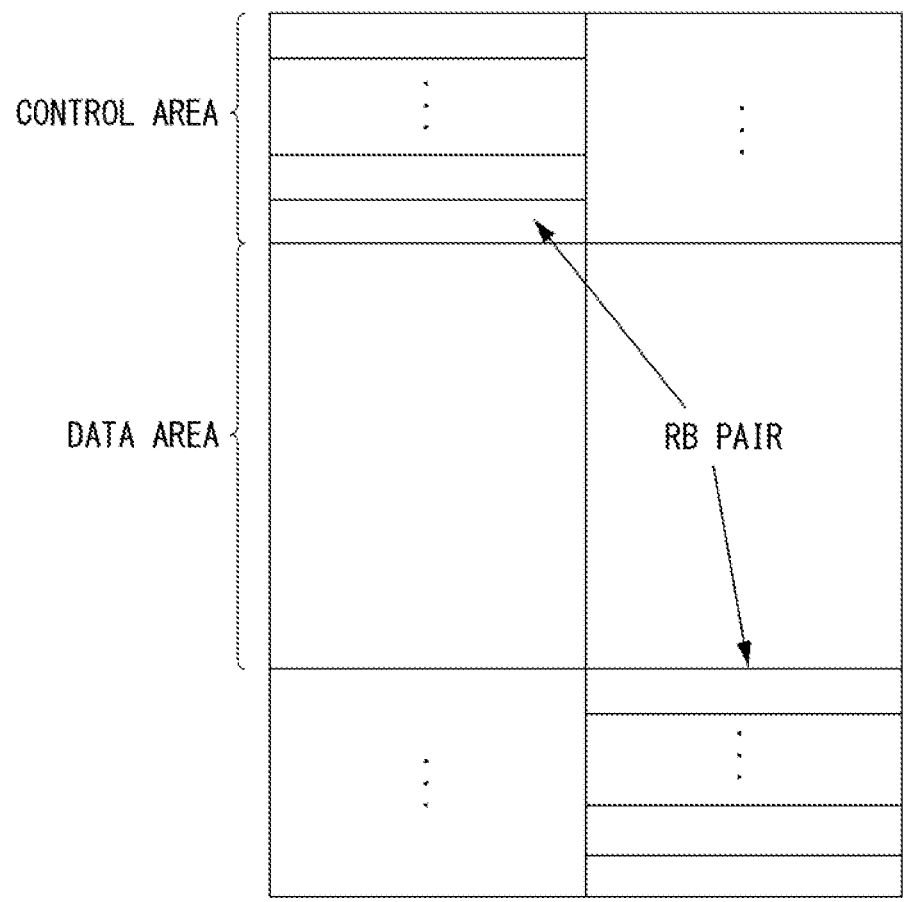

[FIG. 5]
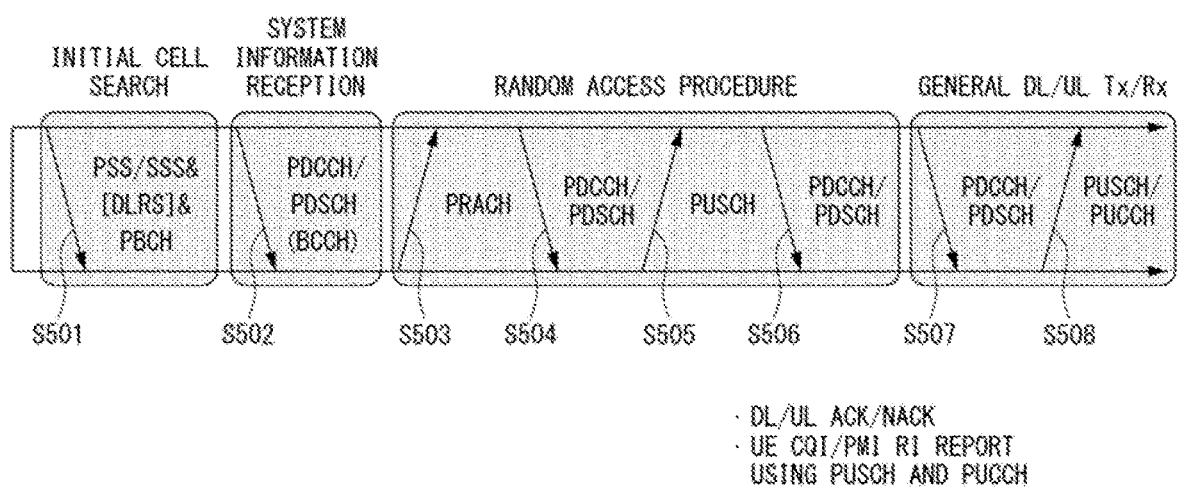
[FIG. 6]
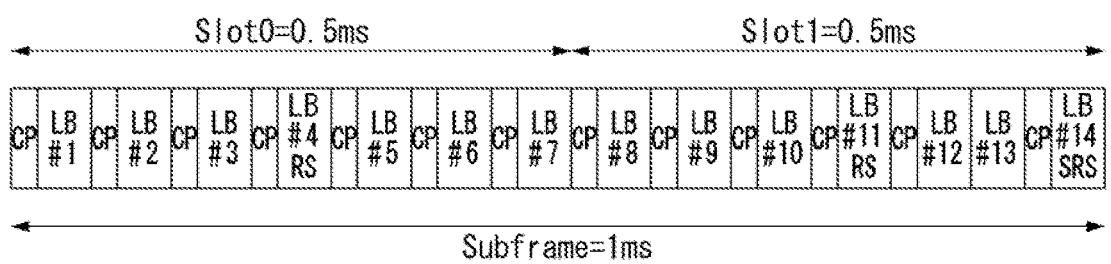

[FIG. 7]
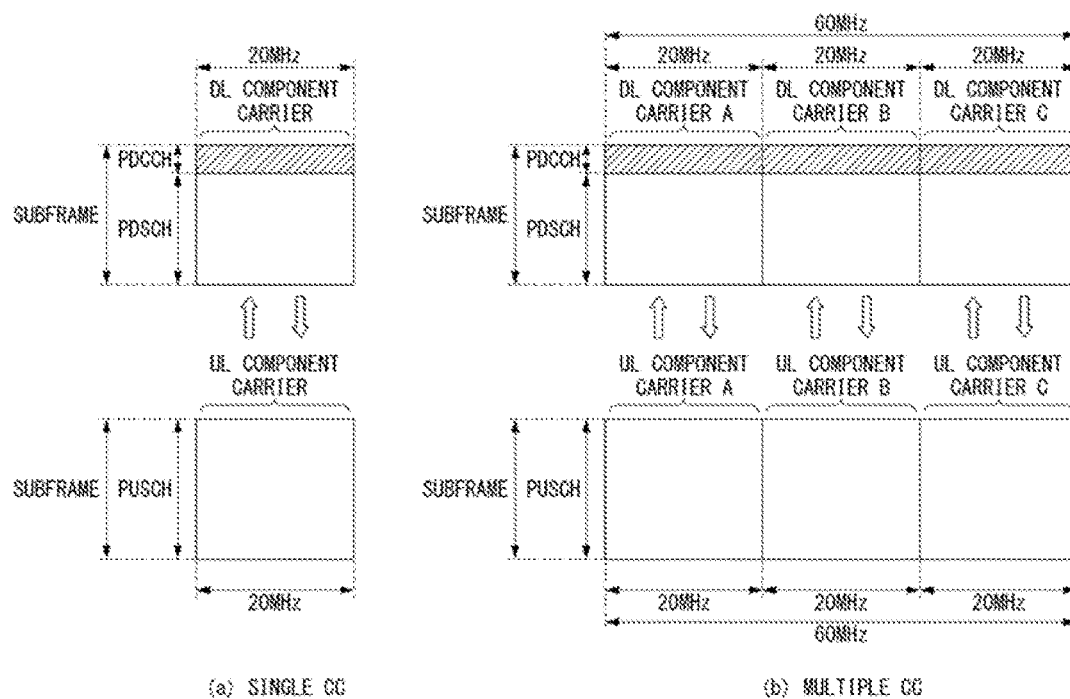

[FIG. 8]
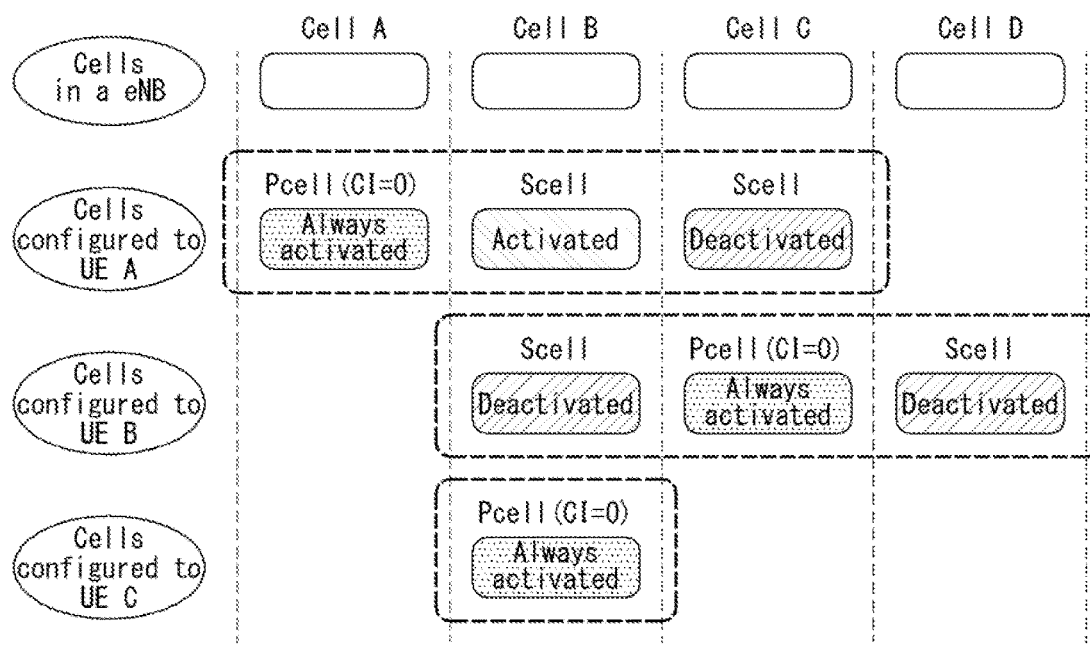

[FIG. 9]
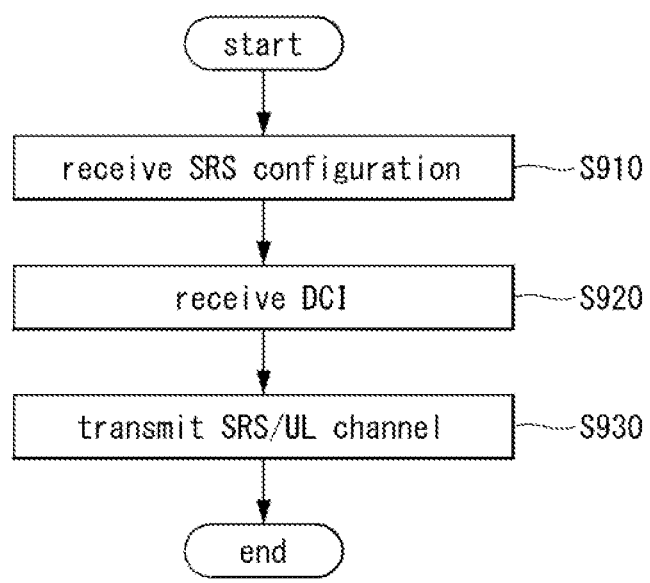

[FIG. 10]
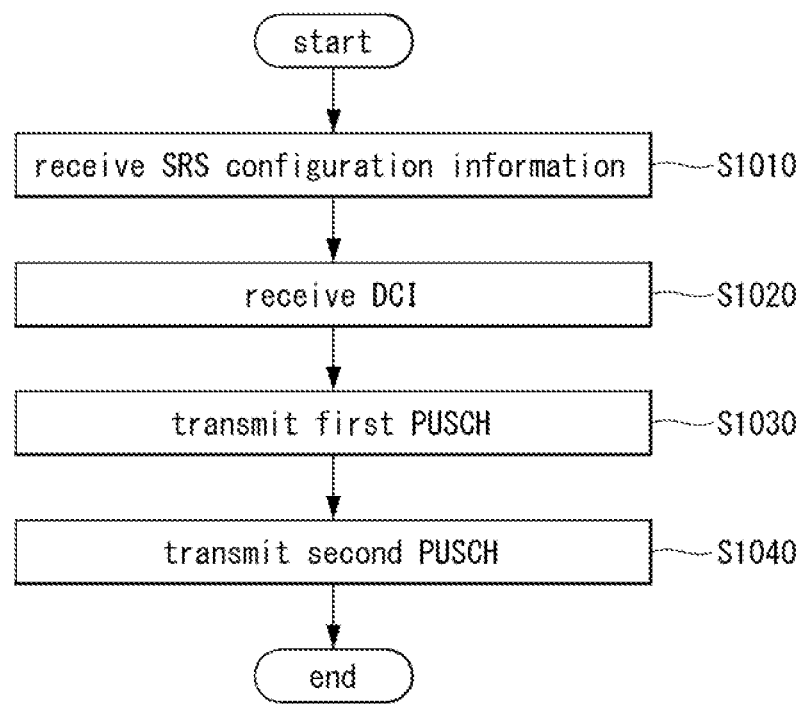

[FIG. 11]
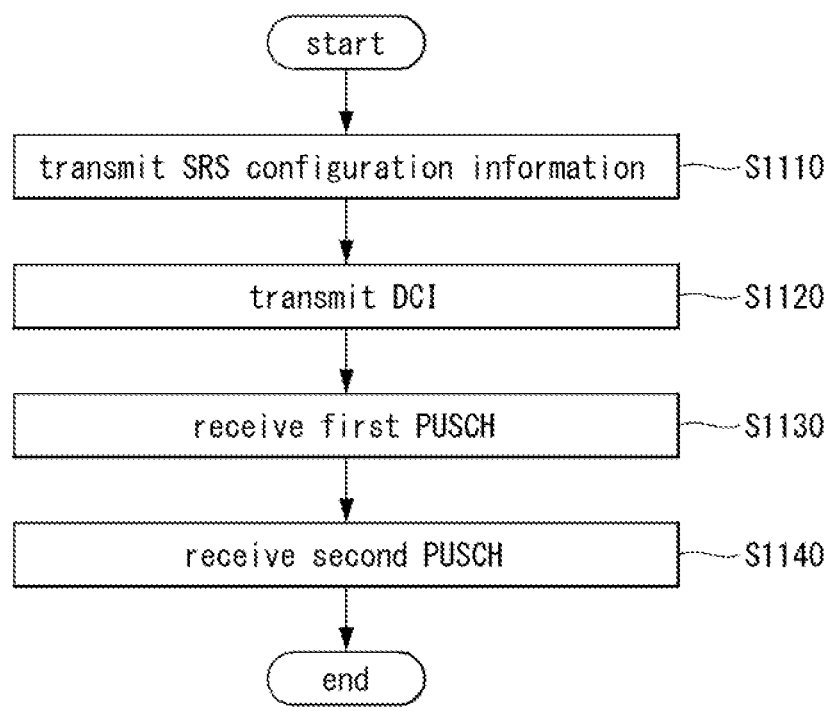

[FIG. 12]
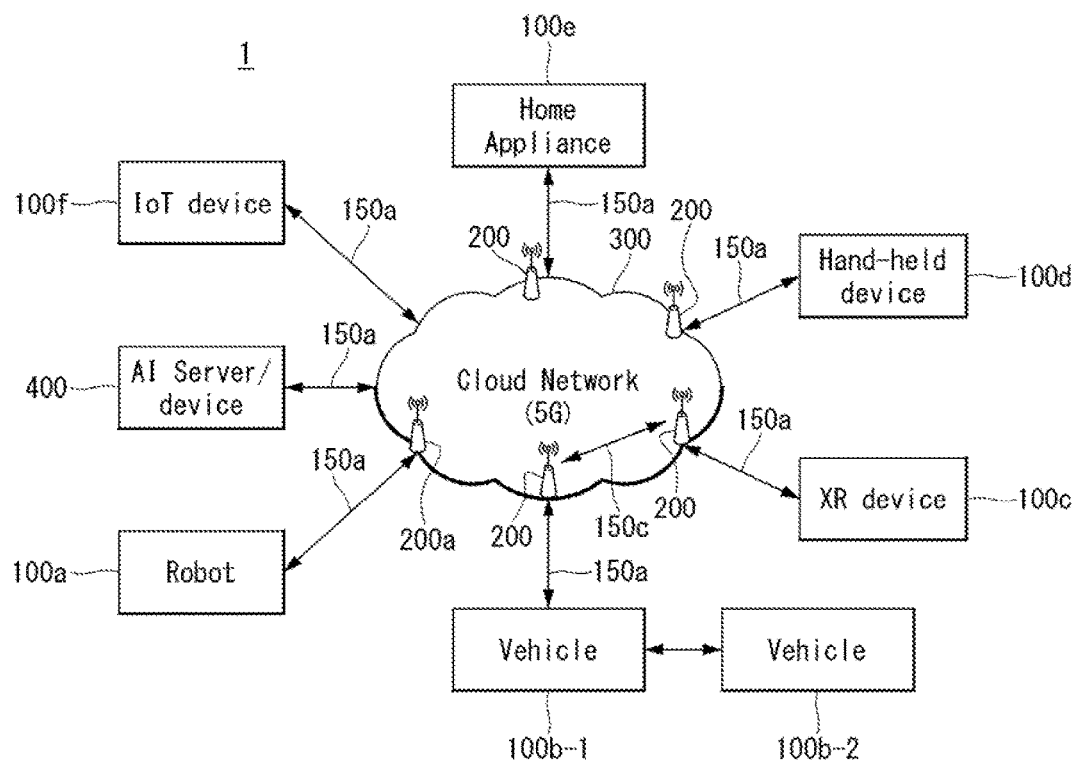

[FIG. 13]
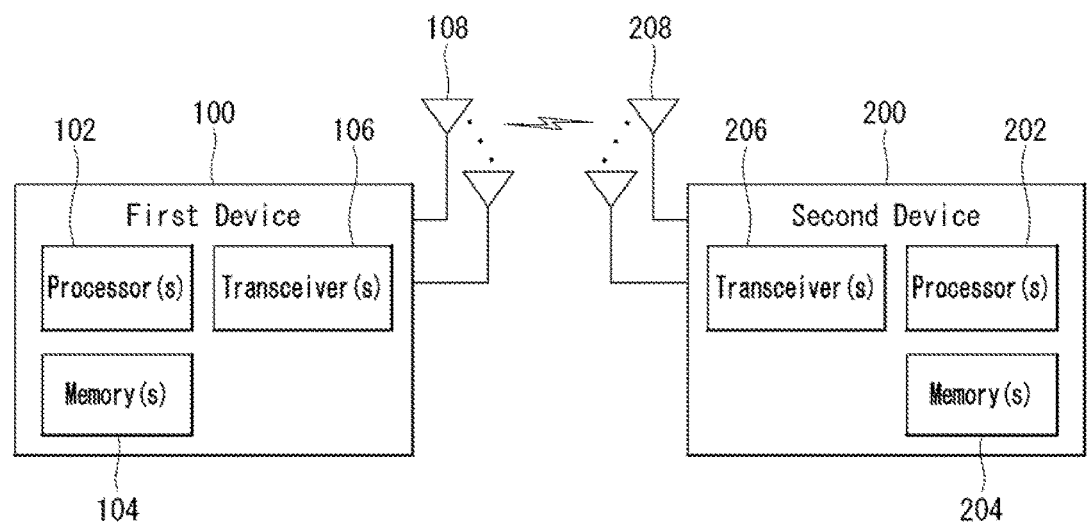

[FIG. 14]
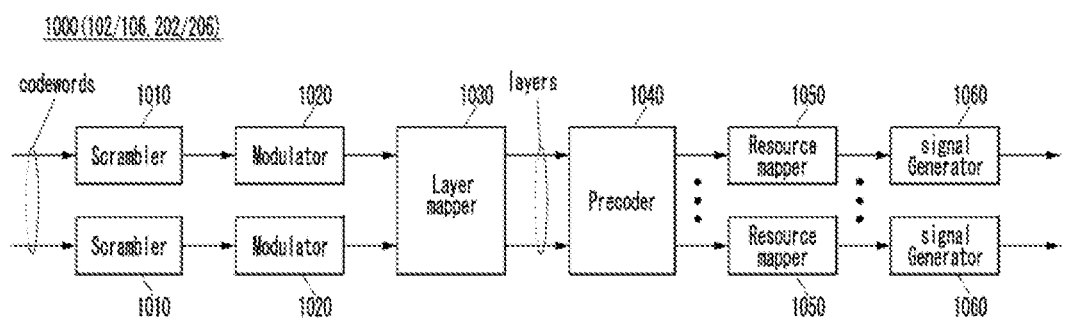

[FIG. 15]
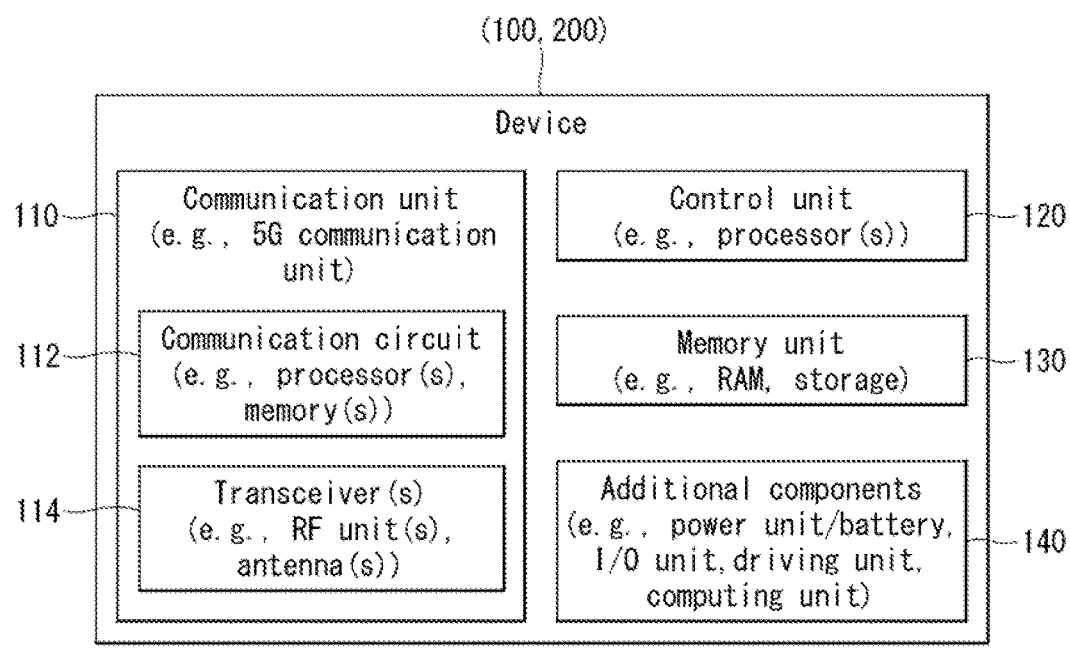

[FIG. 16]
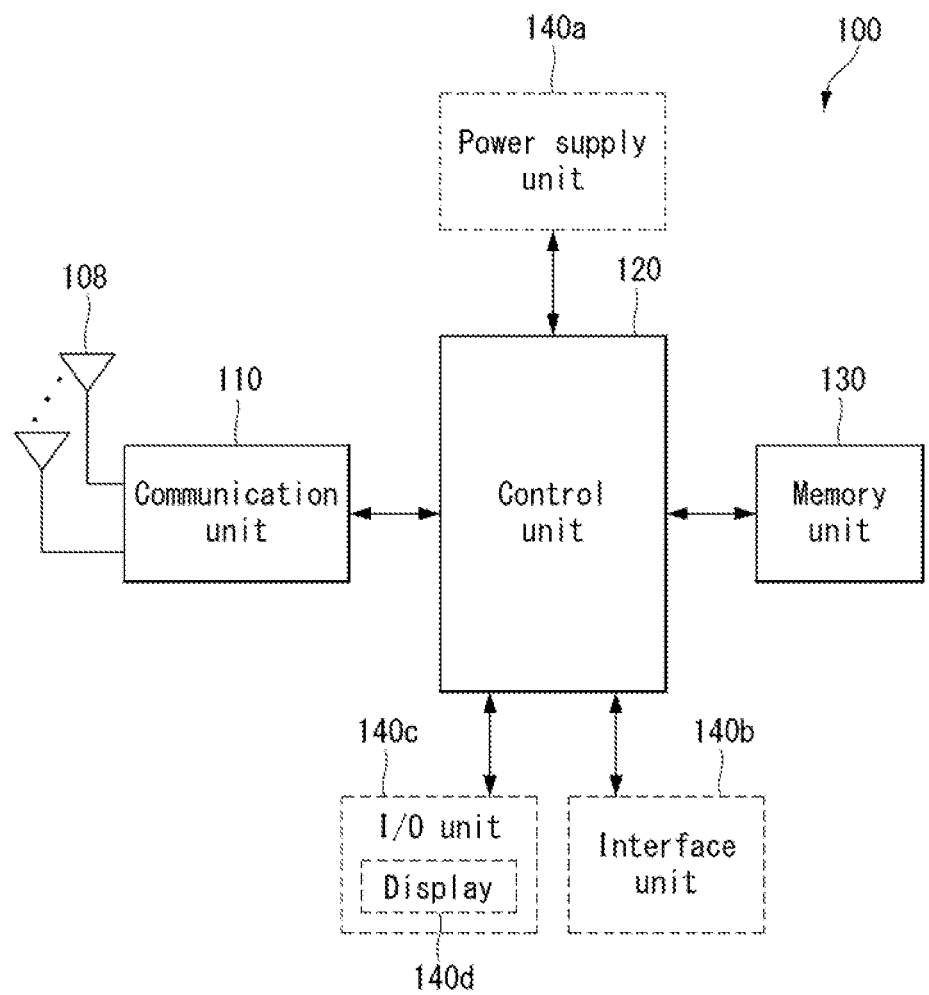

METHOD AND APPARATUS FOR TRANSMITTING/RECEIVING PHYSICAL UPLINK SHARED CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2020/004054, filed Mar. 25, 2020, which claims the benefit of earlier filing data and right of priority to Korean Patent Application No. 10-2019-0035145, filed on Mar. 27, 2019, the contents of which are all incorporated by reference herein in their entirety.

TECHNICAL FIELD

The disclosure relates to a method and device for transmitting/receiving a physical uplink shared channel in a wireless communication system.

BACKGROUND ART

Mobile communication systems were developed to ensure user activity and provide voice service. However, mobile communication systems have extended their range to data service as well as voice, and currently the explosive increase in traffic is causing a lack of resources and there is a users' demand for faster services, which is creating a need for advanced mobile communication systems.

The requirements for next-generation mobile communication systems largely include coping with explosive data traffic, very high data rates per user, coping with a surprisingly large number of connected devices, very low end-to-end latency, and support for high energy efficiency. To this end, research is ongoing on a variety of technologies such as dual connectivity, massive MIMO (massive multiple input multiple output), in-band full duplex, NOMA (non-orthogonal multiple access), support for super wideband, and device networking.

DETAILED DESCRIPTION OF THE DISCLOSURE

Technical Problem

The disclosure proposes a method for transmitting a shared physical uplink channel considering collision between an HARQ operation and an additional SRS.

Objects of the disclosure are not limited to the foregoing, and other unmentioned objects would be apparent to one of ordinary skill in the art from the following description.

Technical Solution

According to an embodiment of the disclosure, a method for transmitting a physical uplink shared channel (PUSCH) by a user equipment (UE) in a wireless communication system comprises receiving configuration information related to a sounding reference signal (SRS), receiving downlink control information (DCI) for scheduling a first PUSCH, transmitting the first PUSCH based on the DCI, and transmitting a second PUSCH.

The SRS is configured in an area other than a specific subframe in a radio frame, the area composed of at least one symbol other than a last symbol of the subframe. The transmission of the second PUSCH is a retransmission of the first PUSCH. The second PUSCH is transmitted based on at least one of a position of a subframe in which the SRS is configured, a position of a subframe in which the transmission of the first PUSCH is scheduled, or a time division duplex related configuration.

The specific subframe may be a dedicated subframe configured to transmit downlink HARQ feedback.

The time division duplex related configuration may be based on any one of TDD configuration 1 to TDD configuration 5.

Based on the subframe in which the transmission of the first PUSCH is scheduled being the specific subframe or being a subframe in which the SRS is not configured, the second PUSCH may be transmitted based on hybrid automatic repeat request (HARQ) feedback.

Based on the subframe in which the transmission of the first PUSCH is scheduled being not the specific subframe or being a subframe in which the SRS is configured, the transmission of the second PUSCH may be dropped.

Based on the subframe in which the transmission of the first PUSCH is scheduled being not the specific subframe or being a subframe in which the SRS is configured, transmission of the second PUSCH may be based on new downlink control information (DCI).

The second PUSCH may be transmitted in the specific subframe.

Based on the subframe in which the transmission of the first PUSCH is scheduled being not the specific subframe or being a subframe in which the SRS is configured, the second PUSCH may be transmitted based on hybrid automatic repeat request (HARQ) feedback.

Based on the subframe in which the second PUSCH is scheduled being identical to the subframe in which the SRS is configured, the transmission of the second PUSCH may be dropped.

The time division duplex related configuration may be based on TDD configuration 0 to TDD configuration 6.

The transmission of the second PUSCH may be dropped.

The second PUSCH may be transmitted in the specific subframe based on new downlink control information (DCI).

The second PUSCH may be transmitted based on hybrid automatic repeat request (HARQ). Based on the subframe in which the second PUSCH is scheduled being identical to the subframe in which the SRS is transmitted, the transmission of the second PUSCH may be dropped.

According to another embodiment of the disclosure, a UE for transmitting a physical uplink shared channel (PUSCH) in a wireless communication system comprises one or more transceivers, one or more processors, and one or more memories operably connectible to the one or more processors and storing instructions to, when the transmission of the PUSCH is executed by the one or more processors, perform operations.

The operations include receiving configuration information related to a sounding reference signal (SRS), receiving downlink control information (DCI) for scheduling a first PUSCH, transmitting the first PUSCH based on the DCI, and transmitting a second PUSCH.

The SRS is configured in an area other than a specific subframe in a radio frame, the area composed of at least one symbol other than a last symbol of the subframe. The transmission of the second PUSCH is a retransmission of the first PUSCH. The second PUSCH is transmitted based on at least one of a position of a subframe in which the SRS is configured, a position of a subframe in which the transmission of the first PUSCH is scheduled, or a time division duplex related configuration.

According to still another embodiment of the disclosure, a device includes one or more memories and one or more processors functionally connected with the one or more memories.

The one or more processors are configured to enable the device to receive configuration information related to a sounding reference signal (SRS), receive downlink control information (DCI) for scheduling a first PUSCH, transmit the first PUSCH based on the DCI, and transmit a second PUSCH.

The SRS is configured in an area other than a specific subframe in a radio frame, the area composed of at least one symbol other than a last symbol of the subframe. The transmission of the second PUSCH is a retransmission of the first PUSCH. The second PUSCH is transmitted based on at least one of a position of a subframe in which the SRS is configured, a position of a subframe in which the transmission of the first PUSCH is scheduled, or a time division duplex related configuration.

According to another embodiment of the disclosure, one or more non-transitory computer-readable media store one or more instructions.

One or more instructions executable by one or more processors are configured to enable the device to receive configuration information related to a sounding reference signal (SRS), receive downlink control information (DCI) for scheduling a first PUSCH, transmit the first PUSCH based on the DCI, and transmit a second PUSCH.

The SRS is configured in an area other than a specific subframe in a radio frame, the area composed of at least one symbol other than a last symbol of the subframe. The transmission of the second PUSCH is a retransmission of the first PUSCH. The second PUSCH is transmitted based on at least one of a position of a subframe in which the SRS is configured, a position of a subframe in which the transmission of the first PUSCH is scheduled, or a time division duplex related configuration.

According to another embodiment of the disclosure, a method for receiving a physical uplink shared channel (PUSCH) by a base station in a wireless communication system comprises transmitting configuration information related to a sounding reference signal (SRS), transmitting downlink control information (DCI) for scheduling a first PUSCH, receiving the first PUSCH based on the DCI, and receiving a second PUSCH.

The SRS is configured in an area other than a specific subframe in a radio frame, the area composed of at least one symbol other than a last symbol of the subframe. The transmission of the second PUSCH is a retransmission of the first PUSCH. The second PUSCH is transmitted based on at least one of a position of a subframe in which the SRS is configured, a position of a subframe in which the transmission of the first PUSCH is scheduled, or a time division duplex related configuration.

According to another embodiment of the disclosure, a base station for receiving a physical uplink shared channel (PUSCH) in a wireless communication system comprises one or more transceivers, one or more processors, and one or more memories operably connectible to the one or more processors and storing instructions to, when the reception of the PUSCH is executed by the one or more processors, perform operations.

The operations include transmitting configuration information related to a sounding reference signal (SRS), transmitting downlink control information (DCI) for scheduling a first PUSCH, receiving the first PUSCH based on the DCI, and receiving a second PUSCH.

The SRS is configured in an area other than a specific subframe in a radio frame, the area composed of at least one symbol other than a last symbol of the subframe. The transmission of the second PUSCH is a retransmission of the first PUSCH. The second PUSCH is transmitted based on at least one of a position of a subframe in which the SRS is configured, a position of a subframe in which the transmission of the first PUSCH is scheduled, or a time division duplex related configuration.

Advantageous Effects

When an additional SRS is configured, the retransmitted PUSCH may collide with the additional SRS. According to an embodiment of the disclosure, an SRS is configured in an area except for a specific subframe in a radio frame. The second PUSCH is transmitted based on at least one of a position of a subframe in which the SRS is configured, a position of a subframe in which the initial transmission of the first PUSCH is scheduled, or a time division duplex related configuration. Therefore, retransmission of the first PUSCH (transmission of the second PUSCH) may be performed to prevent collision with the SRS.

According to an embodiment of the disclosure, the specific subframe is a dedicated subframe configured to transmit downlink HARQ feedback. Collision between the SRS and downlink HARQ feedback is fundamentally prevented. It is possible to prevent DL throughput degradation due to the configuration of the additional SRS.

According to an embodiment of the disclosure, based on the time division duplex related configuration, the second PUSCH is dropped, transmitted based on HARQ feedback, or transmitted based on a new DCI. Therefore, retransmission of the first PUSCH (transmission of the second PUSCH) may be effectively performed depending on whether there is a possibility of collision with the SRS.

Effects of the disclosure are not limited to the foregoing, and other unmentioned effects would be apparent to one of ordinary skill in the art from the following description.

BRIEF DESCRIPTION OF DRAWINGS

FIG. 1 shows the structure of a radio frame in a wireless communication system to which a method proposed in the disclosure may be applied.

FIG. 2 is a diagram illustrating a resource grid for one downlink slot in a wireless communication system to which a method proposed in the disclosure may be applied.

FIG. 3 shows the structure of a downlink subframe in a wireless communication system to which a method proposed in the disclosure may be applied.

FIG. 4 shows the structure of an uplink subframe in a wireless communication system to which a method proposed in the disclosure may be applied.

FIG. 5 illustrates physical channels and general signal transmission used in a 3GPP system.

FIG. 6 illustrates an uplink subframe including an SRS in a wireless communication system to which a method proposed in the disclosure may be applied.

FIG. 7 illustrates one example of a component carrier and carrier aggregation in a wireless communication system to which a method proposed in the disclosure may be applied.

FIG. 8 illustrates an example a distinguishment of cells in a system supporting carrier aggregation, to which a method proposed in the disclosure may be applied.

FIG. 9 is a flowchart for describing the operation of a UE to which a method proposed in the disclosure may be applied.

FIG. 10 is a flowchart illustrating a method for transmitting a physical uplink shared channel by a UE according to an embodiment of the disclosure.

FIG. 11 is a flowchart illustrating a method for receiving a physical uplink shared channel by a base station according to another embodiment of the disclosure.

FIG. 12 illustrates an example of a communication system 1 applied to the disclosure.

FIG. 13 illustrates an example of a wireless device applicable to the disclosure.

FIG. 14 illustrates an example of a signal processing circuit applied to the disclosure.

FIG. 15 illustrates another example of a wireless device applied to the disclosure.

FIG. 16 illustrates an example of a portable device applied to the disclosure.

MODE FOR CARRYING OUT THE DISCLOSURE

Reference will now be made in detail to embodiments of the disclosure, examples of which are illustrated in the accompanying drawings. Wherever possible, the same reference numbers will be used throughout the drawings to refer to the same or like parts. In general, a suffix such as "module" and "unit" may be used to refer to elements or components. Use of such a suffix herein is merely intended to facilitate description of the disclosure, and the suffix itself is not intended to give any special meaning or function. It will be noted that a detailed description of known arts will be omitted if it is determined that the detailed description of the known arts can obscure the embodiments of the disclosure. The accompanying drawings are used to help easily understand various technical features and it should be understood that embodiments presented herein are not limited by the accompanying drawings. As such, the disclosure should be construed to extend to any alterations, equivalents and substitutes in addition to those which are particularly set out in the accompanying drawings.

In the disclosure, abase station means a terminal node of a network directly performing communication with a terminal. In the present document, specific operations described to be performed by the base station may be performed by an upper node of the base station in some cases. That is, it is apparent that in the network constituted by multiple network nodes including the base station, various operations performed for communication with the terminal may be performed by the base station or other network nodes other than the base station. A base station (BS) may be generally substituted with terms such as a fixed station, Node B, evolved-NodeB (eNB), abase transceiver system (BTS), an access point (AP), and the like. Further, a 'terminal' may be fixed or movable and be substituted with terms such as user equipment (UE), a mobile station (MS), a user terminal (UT), a mobile subscriber station (MSS), a subscriber station (SS), an advanced mobile station (AMS), a wireless terminal (WT), a Machine-Type Communication (MTC) device, a Machine-to-Machine (M2M) device, a Device-to-Device (D2D) device, and the like.

Hereinafter, a downlink means communication from the base station to the terminal and an uplink means communication from the terminal to the base station. In the downlink, a transmitter may be a part of the base station and a receiver may be a part of the terminal. In the uplink, the transmitter may be a part of the terminal and the receiver may be a part of the base station.

Specific terms used in the following description are provided to help appreciating the disclosure and the use of the specific terms may be modified into other forms within the scope without departing from the technical spirit of the disclosure.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), non-orthogonal multiple access (NOMA), and the like. The CDMA may be implemented by radio technology universal terrestrial radio access (UTRA) or CDMA2000. The TDMA may be implemented by radio technology such as Global System for Mobile communications (GSM)/General Packet Radio Service (GPRS)/Enhanced Data Rates for GSM Evolution (EDGE). The OFDMA may be implemented as radio technology such as IEEE 802.11(Wi-Fi), IEEE 802.16 (WiMAX), IEEE 802-20, E-UTRA (Evolved UTRA), and the like. The UTRA is a part of a universal mobile telecommunication system (UMTS). 3rd generation partnership project (3GPP) long term evolution (LTE) as a part of an evolved UMTS (E-UMTS) using evolved-UMTS terrestrial radio access (E-UTRA) adopts the OFDMA in a downlink and the SC-FDMA in an uplink. LTE-advanced (A) is an evolution of the 3GPP LTE.

The embodiments of the disclosure may be based on standard documents disclosed in at least one of IEEE 802, 3GPP, and 3GPP2 which are the wireless access systems. That is, steps or parts which are not described to definitely show the technical spirit of the disclosure among the embodiments of the disclosure may be based on the documents. Further, all terms disclosed in the document may be described by the standard document.

3GPP LTE/LTE-A/NR is primarily described for clear description, but technical features of the disclosure are not limited thereto.

General System

FIG. 1 shows the structure of a radio frame in a wireless communication system to which a method proposed in the disclosure may be applied.

3GPP LTE/LTE-A support a radio frame structure type 1 which may be applicable to Frequency Division Duplex (FDD) and a radio frame structure which may be applicable to Time Division Duplex (TDD).

The size of a radio frame in the time domain is represented as a multiple of a time unit of $T\_s=1/(15000*2048)$. A UL and DL transmission includes the radio frame having a duration of $T\_f=307200*T\_s=10$ ms.

(a) of FIG. 1 exemplifies a radio frame structure type 1. The type 1 radio frame may be applied to both of full duplex FDD and half duplex FDD.

A radio frame includes 10 subframes. A radio frame includes 20 slots of $T\_slot=15360*T\_s=0.5$ ms length, and 0 to 19 indexes are given to each of the slots. One subframe includes consecutive two slots in the time domain, and subframe i includes slot 2i and slot 2i+1. The time required for transmitting a subframe is referred to as a transmission time interval (TTI). For example, the length of the subframe i may be 1 ms and the length of a slot may be 0.5 ms.

A UL transmission and a DL transmission I the FDD are distinguished in the frequency domain. Whereas there is no restriction in the full duplex FDD, a ULE may not transmit and receive simultaneously in the half duplex FDD operation.

One slot includes a plurality of Orthogonal Frequency Division Multiplexing (OFDM) symbols in the time domain and includes a plurality of Resource Blocks (RBs) in a frequency domain. In 3GPP LTE, OFDM symbols are used to represent one symbol period because OFDMA is used in downlink. An OFDM symbol may be called one SC-FDMA symbol or symbol period. An RB is a resource allocation unit and includes a plurality of contiguous subcarriers in one slot.

(b) of FIG. 1 shows frame structure type 2.

A type 2 radio frame includes two half frame of 153600*T_s=5 ms length each. Each half frame includes 5 subframes of 30720*T_s=1 ms length.

In the frame structure type 2 of a TDD system, an uplink-downlink configuration is a rule indicating whether uplink and downlink are allocated (or reserved) to all subframes.

Table 1 shows the uplink-downlink configuration.

TABLE 1

| Uplink-Downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Referring to Table 1, in each subframe of the radio frame, 'D' represents a subframe for a DL transmission, 'U' represents a subframe for UL transmission, and 'S' represents a special subframe including three types of fields including a Downlink Pilot Time Slot (DwPTS), a Guard Period (GP), and an Uplink Pilot Time Slot (UpPTS).

A DwPTS is used for an initial cell search, synchronization or channel estimation in a UE. A UpPTS is used for channel estimation in an eNB and for synchronizing a UL transmission synchronization of a UE. A GP is duration for removing interference occurred in a UL owing to multi-path delay of a DL signal between a UL and a DL.

Each subframe i includes slot 2i and slot 2i+1 of T_slot=15360*T_s=0.5 ms.

The UL-DL configuration may be classified into 7 types, and the position and/or the number of a DL subframe, a special subframe and a UL subframe are different for each configuration.

A point of time at which a change is performed from downlink to uplink or a point of time at which a change is performed from uplink to downlink is called a switching point. The periodicity of the switching point means a cycle in which an uplink subframe and a downlink subframe are changed is identically repeated. Both 5 ms and 10 ms are supported in the periodicity of a switching point. If the periodicity of a switching point has a cycle of a 5 ms downlink-uplink switching point, the special subframe S is present in each half frame. If the periodicity of a switching point has a cycle of a 5 ms downlink-uplink switching point, the special subframe S is present in the first half frame only.

In all the configurations, 0 and 5 subframes and a DwPTS are used for only downlink transmission. An UpPTS and a subframe subsequent to a subframe are always used for uplink transmission.

Such uplink-downlink configurations may be known to both an eNB and UE as system information. An eNB may notify UE of a change of the uplink-downlink allocation state of a radio frame by transmitting only the index of uplink-downlink configuration information to the UE whenever the uplink-downlink configuration information is changed. Furthermore, configuration information is kind of downlink control information and may be transmitted through a Physical Downlink Control Channel (PDCCH) like other scheduling information. Configuration information may be transmitted to all UEs within a cell through a broadcast channel as broadcasting information.

Table 2 represents configuration (length of DwPTS/GP/UpPTS) of a special subframe.

TABLE 2

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · T_s | 2192 · T_s | 2560 · T_s | 7680 · T_s | 2192 · T_s | 2560 · T_s |
| 1 | 19760 · T_s | | | 20480 · T_s | | |
| 2 | 21952 · T_s | | | 23040 · T_s | | |
| 3 | 24144 · T_s | | | 25600 · T_s | | |
| 4 | 26336 · T_s | | | 7680 · T_s | 4384 · T_s | 5120 · T_s |
| 5 | 6592 · T_s | 4384 · T_s | 5120 · T_s | 20480 · T_s | | |
| 6 | 19760 · T_s | | | 23040 · T_s | | |
| 7 | 21952 · T_s | | | — | — | — |
| 8 | 24144 · T_s | | | — | — | — |

The structure of a radio subframe according to the example of FIG. 1 is just an example, and the number of subcarriers included in a radio frame, the number of slots included in a subframe and the number of OFDM symbols included in a slot may be changed in various manners.

FIG. 2 is a diagram illustrating a resource grid for one downlink slot in a wireless communication system to which a method proposed in the disclosure may be applied.

Referring to FIG. 2, one downlink slot includes a plurality of OFDM symbols in a time domain. It is described herein that one downlink slot includes 7 OFDMA symbols and one resource block includes 12 subcarriers for exemplary purposes only, and the disclosure is not limited thereto.

Each element on the resource grid is referred to as a resource element, and one resource block (RB) includes 12×7 resource elements. The number of RBs $N^{DL}$ included in a downlink slot depends on a downlink transmission bandwidth.

The structure of an uplink slot may be the same as that of a downlink slot.

FIG. 3 shows the structure of a downlink subframe in a wireless communication system to which a method proposed in the disclosure may be applied.

Referring to FIG. 3, a maximum of three OFDM symbols located in a front portion of a first slot of a subframe correspond to a control region in which control channels are allocated, and the remaining OFDM symbols correspond to a data region in which a physical downlink shared channel (PDSCH) is allocated. Downlink control channels used in 3GPP LTE include, for example, a physical control format indicator channel (PCFICH), a physical downlink control channel (PDCCH), and a physical hybrid-ARQ indicator channel (PHICH).

A PCFICH is transmitted in the first OFDM symbol of a subframe and carries information about the number of OFDM symbols (i.e., the size of a control region) which is used to transmit control channels within the subframe. A PHICH is a response channel for uplink and carries an acknowledgement (ACK)/not-acknowledgement (NACK) signal for a Hybrid Automatic Repeat Request (HARQ). Control information transmitted in a PDCCH is called Downlink Control Information (DCI). DCI includes uplink resource allocation information, downlink resource allocation information, or an uplink transmission (Tx) power control command for a specific ULE group.

A PDCCH may carry information about the resource allocation and transport format of a downlink shared channel (DL-SCH) (this is also called an "downlink grant"), resource allocation information about an uplink shared channel (UL-SCH) (this is also called a "uplink grant"), paging information on a PCH, system information on a DL-SCH, the resource allocation of a higher layer control message, such as a random access response transmitted on a PDSCH, a set of transmission power control commands for individual UE within specific UE group, and the activation of a Voice over Internet Protocol (VoIP), etc. A plurality of PDCCHs may be transmitted within the control region, and UE may monitor a plurality of PDCCHs. A PDCCH is transmitted on a single Control Channel Element (CCE) or an aggregation of some contiguous CCEs. A CCE is a logical allocation unit that is used to provide a PDCCH with a coding rate according to the state of a radio channel. A CCE corresponds to a plurality of resource element groups. The format of a PDCCH and the number of available bits of a PDCCH are determined by an association relationship between the number of CCEs and a coding rate provided by CCEs.

An eNB determines the format of a PDCCH based on DCI to be transmitted to UE and attaches a Cyclic Redundancy Check (CRC) to control information. A unique identifier (a Radio Network Temporary Identifier (RNTI)) is masked to the CRC depending on the owner or use of a PDCCH. If the PDCCH is a PDCCH for specific UE, an identifier unique to the UE, for example, a Cell-RNTI (C-RNTI) may be masked to the CRC. If the PDCCH is a PDCCH for a paging message, a paging indication identifier, for example, a Paging-RNTI (P-RNTI) may be masked to the CRC. If the PDCCH is a PDCCH for system information, more specifically, a System Information Block (SIB), a system information identifier, for example, a System Information-RNTI (SI-RNTI) may be masked to the CRC. A Random Access-RNTI (RA-RNTI) may be masked to the CRC in order to indicate a random access response which is a response to the transmission of a random access preamble by UE.

FIG. 4 shows the structure of an uplink subframe in a wireless communication system to which a method proposed in the disclosure may be applied.

Referring to FIG. 4, the uplink subframe may be divided into a control region and a data region in a frequency domain. A physical uplink control channel (PUCCH) carrying uplink control information is allocated to the control region. A physical uplink shared channel (PUSCH) carrying user data is allocated to the data region. In order to maintain single carrier characteristic, one UE does not send a PUCCH and a PUSCH at the same time.

A Resource Block (RB) pair is allocated to a PUCCH for one UE within a subframe. RBs belonging to an RB pair occupy different subcarriers in each of 2 slots. This is called that an RB pair allocated to a PUCCH is frequency-hopped in a slot boundary.

Physical Channel and General Signal Transmission

FIG. 5 illustrates physical channels and general signal transmission used in a 3GPP system. In a wireless communication system, the UE receives information from the eNB through Downlink (DL) and the UE transmits information from the eNB through Uplink (UL). The information which the eNB and the UE transmit and receive includes data and various control information and there are various physical channels according to a type/use of the information which the eNB and the UE transmit and receive.

When the UE is powered on or newly enters a cell, the UE performs an initial cell search operation such as synchronizing with the eNB (S501). To this end, the UE may receive a Primary Synchronization Signal (PSS) and a (Secondary Synchronization Signal (SSS) from the eNB and synchronize with the eNB and acquire information such as a cell ID or the like. Thereafter, the UE may receive a Physical Broadcast Channel (PBCH) from the eNB and acquire in-cell broadcast information. Meanwhile, the UE receives a Downlink Reference Signal (DL RS) in an initial cell search step to check a downlink channel status.

A UE that completes the initial cell search receives a Physical Downlink Control Channel (PDCCH) and a Physical Downlink Control Channel (PDSCH) according to information loaded on the PDCCH to acquire more specific system information (S502).

Meanwhile, when there is no radio resource first accessing the eNB or for signal transmission, the UE may perform a Random Access Procedure (RACH) to the eNB (S503 to S506). To this end, the UE may transmit a specific sequence to a preamble through a Physical Random Access Channel (PRACH) (S503 and S505) and receive a response message (Random Access Response (RAR) message) for the preamble through the PDCCH and a corresponding PDSCH. In the case of a contention based RACH, a Contention Resolution Procedure may be additionally performed (S506).

The UE that performs the above procedure may then perform PDCCH/PDSCH reception (S507) and Physical Uplink Shared Channel (PUSCH)/Physical Uplink Control Channel (PUCCH) transmission (S508) as a general uplink/ downlink signal transmission procedure. In particular, the UE may receive Downlink Control Information (DCI) through the PDCCH. Here, the DCI may include control information such as resource allocation information for the UE and formats may be differently applied according to a use purpose.

Meanwhile, the control information which the UE transmits to the eNB through the uplink or the UE receives from the eNB may include a downlink/uplink ACK/NACK signal, a Channel Quality Indicator (CQI), a Precoding Matrix Index (PMI), a Rank Indicator (RI), and the like. The UE may transmit the control information such as the CQI/PMI/RI, etc., through the PUSCH and/or PUCCH.

Sounding Reference Signal (SRS)

An SRS is mainly used for channel quality measurement to perform uplink frequency-selective scheduling and is not related to transmission of uplink data and/or control information. However, the disclosure is not limited thereto and the SRS may be used for various other purposes to enhance power control or to support various start-up functions of recently unscheduled terminals. As an example of the start-up function, an initial modulation and coding scheme (MCS), initial power control for data transmission, timing advance, and frequency semi-selective scheduling may be included. In this case, frequency semi-selective scheduling refers to scheduling that selectively allocates frequency resources to a first slot of a subframe and allocating the frequency resources by pseudo-randomly jumping to another frequency in a second slot.

Further, the SRS may be used for measuring a downlink channel quality under the assumption that radio channels are reciprocal between the uplink and the downlink. The assumption is particularly effective in a time division duplex (TDD) system in which the uplink and the downlink share the same frequency spectrum and are separated in a time domain.

The SRS subframes transmitted by a certain UE in a cell may be represented by a cell-specific broadcast signal. A 4 bit cell-specific 'srsSubframeConfiguration' parameter represents 15 available subframe arrays through which the SRS may be transmitted over each radio frame. The arrays provide flexibility for adjustment of SRS overhead according to a deployment scenario.

A 16-th array completely turns off a switch of the SRS in the cell and this is primarily suitable for a serving cell that serves high-speed terminals.

FIG. 6 illustrates an uplink subframe including an SRS in a wireless communication system to which a method proposed in the disclosure may be applied.

Referring to FIG. 6, the SRS is continuously transmitted on the last SC-FDMA symbol on the arranged subframe. Therefore, the SRS and the DMRS are located in different SC-FDMA symbols.

PUSCH data transmission is not allowed in a specific SC-FDMA symbol for SRS transmission and as a result, when the sounding overhead is the highest, that is, even if SRS symbols are included in all subframes, the sounding overhead does not exceed approximately 7%.

Each SRS symbol is generated by a basic sequence (random sequence or a sequence set based on Zadoff-Ch (ZC)) for a given time unit and frequency band, and all terminals in the same cell use the same basic sequence. In this case, the SRS transmissions from a plurality of UEs in the same cell at the same time in the same frequency band are orthogonal by different cyclic shifts of the basic sequence, and are distinguished from each other.

By assigning different basic sequences to respective cells, the SRS sequences from different cells may be distinguished, but orthogonality between different basic sequences is not guaranteed.

SRS Transmission in NR System

In NR systems, an SRS sequence for SRS resources may be generated by Equation 1 below.

$$r^{(p_i)}(n,l') = r_{u,v}^{(\alpha_i,\delta)}(n)$$

$$0 \leq n \leq 271 \cdot N_{sc}^{RB}/K_{TC}$$

$$l' \in \{0,1,\ldots,N_{symb}^{SRS}-1\})$$ [Equation 1]

In Equation 1, $r_{u,v}^{(\alpha_i,\delta)}(n)$ denotes the sequence number (v) of SRS and the sequence set by the sequence group (u), and the transmission comb (TC) number, K_TC($K_{TC}$), may be included in the higher layer parameter, SRS-TransmissionComb.

Further, for antenna port $p_i$, the cyclic shift (SC) $\alpha_i$ may be given as in Equation 2 below.

$$\alpha_i = 2\pi \frac{n_{SRS}^{cs,i}}{n_{SRS}^{cs,max}}$$ [Equation 2]

$$n_{SRS}^{cs,i} = \left(n_{SRS}^{cs} + \frac{n_{SRS}^{cs,max} p_i}{N_{ap}}\right) \bmod n_{SRS}^{cs,max}$$

In Equation 2, $n_{SRS}^{cs} \in \{0, 1, \ldots, n_{SRS}^{cs,max}\}$ may be given by the higher layer parameter SRS-CyclicShiftConFIG. Further, the maximum value of the cyclic shift, if K_TC is 4, may be 12 (i.e., $n_{SRS}^{cs,max}=12$) and, if K_TC is 2, 8 (i.e., $n_{SRS}^{cs,max}=8$).

The sequence group (u)(u=($f_{gh}(n_{s,f}^\mu,l')+n_{ID}^{SRS}$ mod 30) mod 30) and the sequence number (u) may comply with the higher layer parameter SRS-GroupSequenceHopping. Further, the SRS sequence identifier $n_{ID}^{SRS}$ may be given by the higher layer parameter SRS-SequenceId. l'(i.e., l'∈{0, 1, . . . , $N_{symb}^{SRS}-1$}) denotes the OFDM symbol number in the SRS resource.

At this time, if SRS-GroupSequenceHopping is 0, group hopping and sequence hopping are not used, which may be represented as in Equation 3 below.

$$f_{gh}(n_{s,f}^\mu,l')=0$$

$$v=0$$ [Equation 3]

In Equation 3, f_gh(x, y) denotes sequence group hopping, and v denotes sequence hopping.

Or, if SRS-GroupSequenceHopping is 1, group hopping, not sequence hopping, is used, and this may be expressed as in Equation 4.

$$f_{gh}(n_{s,f}^\mu,l')=(\Sigma_{m=0}^{7}c(8(n_{s,f}^\mu N_{symb}^{SRS}+l')+m)\cdot 2^m) \bmod 30$$

$$v=0$$ [Equation 4]

In Equation 4, f_gh(x, y) denotes sequence group hopping, and v denotes sequence hopping. c(i) denotes the pseudo-random sequence and may be initialized as $c_{init}=\lfloor n_{ID}^{SRS}/30 \rfloor$ at the start of each radio frame.

Or, if SRS-GroupSequenceHopping is 2, sequence hopping, not group hopping, is used, and this may be expressed as in Equation 5.

$$f_{gh}(n_{s,f},l') = 0$$ [Equation 5]

$$v = \begin{cases} c(n_{s,f}N_{symb}^{SRS}+l') & M_{sc,b}^{SRS} \geq 3N_{sc}^{RB} \\ 0 & \text{otherwise} \end{cases}$$

In Equation 5, f_gh(x, y) denotes sequence group hopping, and v denotes sequence hopping. c(i) denotes the pseudo-random sequence and may be initialized as $c_{init} = \lfloor n_{ID}^{SRS}/30 \rfloor \cdot 2^5 + (n_{ID}^{SRS} + \Delta_{ss})$ mod 30 at the start of each radio frame (where, $\Delta_{ss} \in \{0, 1, \ldots, 29\}$).

Sounding Reference Signal (SRS) Hopping

SRS hopping may be performed only upon periodic SRS triggering (e.g., triggering type 0). Further, allocation of SRS resources may be provided according to a pre-defined hopping pattern. In this case, the hopping pattern may be designated UE-specifically via higher layer signaling (e.g., RRC signaling) and no overlap is allowed.

Further, SRS is frequency-hopped using the hopping pattern in every subframe where cell-specific and/or UE-specific SRS is transmitted, and the start position and hopping equation in the frequency domain of SRS hopping may be interpreted via Equation 6 below.

$$k_0^{(p)} = \bar{k}_0^{(p)} + \sum_{b=0}^{B_{SRS}} {}'K_{TC} M_{sc,b}^{RS} n_b \quad \text{[Equation 6]}$$

$$n_b = \begin{cases} \lfloor 4n_{RRC}/m_{SRS,b} \rfloor \bmod N_b & b \leq b_{hop} \\ \{F_b(n_{SRS}) + \lfloor 4n_{RRC}/m_{SRS,b} \rfloor\} \bmod N_b & \text{otherwise} \end{cases}$$

$$F_b(n_{SRS}) = \begin{cases} (N_b/2) \dfrac{\left\lfloor n_{SRS} \bmod \prod_{b'=b_{hop}}^{b} N_{b'} \right\rfloor}{\prod_{b'=b_{hop}}^{b-1} N_{b'}} + \left\lfloor \dfrac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases}$$

$$n_{SRS} = \begin{cases} 2N_{SP} n_f + 2(N_{SP} - 1)\lfloor \frac{n_s}{10} \rfloor + \lfloor \frac{T_{offset}}{T_{offset\_max}} \rfloor, & \text{for 2 ms } SRS \text{ periodicity of frame structure type 2} \\ \lfloor (n_f \times 10 + \lfloor n_s/2 \rfloor)/T_{SRS} \rfloor, & \text{otherwise} \end{cases}$$

In Equation 6, nSRS means the hopping interval in the time domain, and Nb denotes the number of branches allocated to tree level b where b may be determined by the BSRS configuration in the dedicated RRC.

FIG. 7 illustrates one example of a component carrier and carrier aggregation in a wireless communication system to which a method proposed in the disclosure may be applied.

(a) of FIG. 7 shows a single carrier structure defined in the LTE system. Two types of component carriers are used: DL CC and UL CC. A component carrier may have frequency bandwidth of 20 MHz.

(b) of FIG. 7 shows a carrier aggregation structure used in the LTE A system. (b) of FIG. 7 shows a case where three component carriers having frequency bandwidth of 20 MHz are aggregated. In this example, 3 DL CCs and 3 UL CCs are employed, but the number of DL CCs and UL CCs is not limited to the example. In the case of carrier aggregation, the UE is capable of monitoring 3 CCs at the same time, capable of receiving a downlink signal/data and transmitting an uplink signal/data.

If a particular cell manages N DL CCs, the network may allocate M (M≤N) DL CCs to the UE. At this time, the UE may monitor only the M DL CCs and receive a DL signal from the M DL CCs. Also, the network may assign priorities for L (L≤M≤N) DL CCs so that primary DL CCs may be allocated to the UE; in this case, the UE has to monitor the L DL CCs. This scheme may be applied in the same manner to uplink transmission.

Linkage between a carrier frequency of downlink resources (or DL CC) and a carrier frequency of uplink resources (or UL CC) may be designated by a higher layer message such as an RRC message or system information. For example, according to the linkage defined by system information block type 2 (SIB2), a combination of DL resources and UL resources may be determined. More specifically, the linkage may refer to a mapping relationship between a DL CC through which a PDCCH carrying an UL grant is transmitted and an UL CC that uses the UL grant; or a mapping relationship between a DL CC (or an UL CC) through which data for HARQ signal are transmitted and an UL CC (or a DL CC) through which a HARQ ACK/NACK signal is transmitted.

FIG. 8 illustrates an example a distinguishment of cells in a system supporting carrier aggregation, to which a method proposed in the disclosure may be applied.

Referring to FIG. 8, a configured cell is a cell which is configured for carrier aggregation based on a measurement report among cells of an eNB and is configured for each UE as shown in FIG. 5. A configured cell may reserve a resource for ack/nack transmission in advance with respect to PDSCH transmission. An activated cell is a cell configured to actually transmit a PDSCH/PUSCH among the configured cells, which performs Channel State Information (CSI) reporting for PDSCH/PUSCH transmission and Sounding Reference Signal (SRS) transmission. A de-activated cell is a cell configured not to perform PDSCH/PUSCH transmission by a command from the eNB or timer operation, which may stop CSI reporting and SRS transmission.

The foregoing description may be combined with the methods described below according to the disclosure or may be provided to specify or clarify the technical features of the methods proposed herein. Further, the embodiments and/or methods described in the disclosure are differentiated solely for ease of description, and some components in any one method may be replaced, or combined with components of another method.

Hereinafter, details related to the additional SRS is described in detail.

In Rel-16 LTE MIMO enhancement (especially in massive MIMO of TDD configuration), it was decided at RAN plenary #80 meeting to enhance the capacity and coverage of SRS to more effectively utilize DL/UL channel reciprocity. Looking at the details, it is intended to introduce a multi symbol SRS not only in a special subframe of the LTE TDD system but also in a normal UL subframe. However, this may cause collision between the PUCCH, which is an uplink (UL) control channel, and the PUSCH, which is an uplink (UL) data channel.

In the disclosure, particularly in preparation for the case where HARQ ACK/NACK feedback for downlink (DL) data collides with the above multi-symbol SRS (e.g., additional SRS), a HARQ reference configuration method in configuring and indicating the additional SRS between the base station and the UE is described. Further, the UE's operations in the subsequent DL HARQ and UL HARQ are described.

Contents related to the trigger type of SRS and a relationship between SRS transmission and PUSCH (PUCCH) transmission are described in detail below.

The sounding reference signal (SRS) may be transmitted in the last symbol of each subframe in the frequency division duplex system (FDD).

In the time division duplex (TDD) system, in addition to SRS transmission in an uplink subframe, an SRS having one or two symbols may be transmitted according to a special subframe configuration using uplink pilot timeslot (UpPTS) in a special subframe.

In the special subframe, an SRS having 2 or 4 symbols may be transmitted according to whether an SC-FDMA symbol is configured for additional uplink use in addition to the existing UpPTS.

Trigger types for the SRS are divided into type 0 and type 1 according to time domain characteristics. Type 0 is a periodic SRS based on a higher layer configuration, and type 1 is an aperiodic SRS triggered by DCI.

In relation to the transmission of the SRS and the transmission of the PUSCH, the UE and the base station may operate as follows.

The base station may configure a combination of subframe numbers in which a cell specific SRS has been allocated in the UE in a normal subframe in a cell specific manner.

When performing PUSCH resource element mapping in the subframe to which the cell specific SRS has been allocated, the UE protects the SRS by leaving the last symbol in which the cell specific SRS has been configured blank regardless of whether a UE specific SRS is configured. Further, when PUSCH transmission and SRS transmission collide in the uplink pilot timeslot (UpPTS) of a TDD special subframe, no SRS is transmitted. Even in the case of carrier aggregation, if the SRS of the first serving cell and the PUSCH of the second serving cell overlap the same symbol in the time domain, the UE may drop the SRS.

The operation of the UE related to the transmission of the SRS and the transmission of the PUCCH is described below.

When the SRS and the PUCCH format 2 series (2/2a/2b) collide in the same subframe of the same serving cell, the ULE may operate as follows.

In the case of an SRS triggered by type 0, the UE does not transmit the corresponding SRS.

In the case of an SRS triggered by type 1, 1) the UE does not transmit the corresponding SRS when it collides with a PUCCH including HARQ-ACK, and 2) the UE may transmit the corresponding Srs when it collides with PUCCH format 2 including no HARQ-ACK.

The UE may simultaneously transmit the SRS and the PUCCH in the same subframe using a shortened PUCCH. Specifically, the shortened PUCCH is PUCCH format 1 (1/1a/b) and format 3, 4, and 5, and the data of uplink control information (UCI) is not included in the last symbol of the corresponding subframe.

In the shortened PUCCH, whether to transmit simultaneously with the SRS is set by the higher layer parameter ackNackSRS-SimultaneousTransmission.

When simultaneous transmission of SRS and shortened PUCCH is not set (when ackNackSRS-SimultaneousTransmission is FALSE), if the SRS collides with the PUCCH including a positive SR and/or HARQ-ACK in the same subframe (or slot or subslot), the UE does not transmit the SRS.

Even when simultaneous transmission of the SRS and the shortened PUCCH is set (when ackNackSRS-SimultaneousTransmission is TRUE), if the SRS overlaps at the symbol level with the shortened PUCCH including HARQ-ACK and/or positive SR, the UE does not transmit the SRS.

In the case of PUCCH format 1 series and format 3, in the subframe in which a cell-specific SRS has been configured, the format of the shortened PUCCH may be used regardless of whether a UE-specific SRS is configured. In the case of PUCCH format 4/5, in the subframe in which a cell-specific SRS has been configured, the format of the shortened PUCCH is used if it overlaps the bandwidth of the cell-specific SRS regardless of whether the UE-specific SRS is configured.

Hereinafter, an agreement related to LTE MIMO enhancement (additional SRS) that may be applied to the method proposed in the disclosure is described.

1. Agreement (Scenarios Considered for Additional SRS)

The work for additional SRS symbols in this WI should consider the following scenarios TDD for non-CA TDD only CA

FDD-TDD CA

2. Agreement (Position in Time Domain of Additional SRS Symbol)

Positions in the time domain of additional SRS symbols possible in one general UL subframe for a cell include:

Option 1: Use all symbols in one slot for SRS from a cell perspective

For example, another slot of the subframe may be used for PUSCH transmission for an sTTI capable UE.

Option 2: Use all symbols in one subframe for SRS from a cell perspective

Option 3: A subset of symbols in one slot may be used for SRS from a cell perspective However, the position of the additional SRS is not limited to the above-described options.

For an area with a low downlink SINR, support of an additional SRS symbol per UE in a normal subframe may bring a gain in downlink performance.

3. Agreement (Aperiodic SRS Support)

Aperiodic SRS transmission may be supported for additional SRS symbols.

4. Agreement (Transmission of Additional SRS)

A UE configured with an additional SRS in one UL subframe may transmit the SRS based on any one of the following options.

Option 1: Frequency hopping is supported within one UL subframe.

Option 2: Repetition within one UL subframe is supported.

Option 3: Both frequency hopping and repetition are supported within one UL subframe.

5. Agreement

Both intra-subframe frequency hopping and repetition are supported for aperiodic SRS in additional symbols).

6. Agreement (Additional SRS and Antenna Switching)

Antenna switching within a subframe is supported for aperiodic SRS in an additional SRS symbol.

The term additional SRS symbol is additionally introduced in Rel-16 and the last symbol is not part of the additional SRS symbol.

7. Agreement (Transfer of Legacy SRS and Additional SRS)

Both legacy SRS and additional SRS symbol(s) may be configured for the same UE.

If the legacy SRS is aperiodic, the UE may transmit the legacy SRS or additional SRS symbol(s) in the same subframe.

If the legacy SRS is periodic, the UE may transmit the legacy SRS and additional SRS symbol(s) in the same or different subframes.

8. Agreement (Number of Symbols in Additional SRS)

The number of symbols that may be configured in the ULE as an additional SRS is 1-13.

9. Agreement

For the temporal position of possible additional SRS (SRS) symbols in one general UL subframe for a cell:

use 1 to 13 symbols in one subframe for SRS from a cell point of view

10. Agreement (Power Control)

Same power control configuration applies for all additional SRS symbols configured to a single UE.

11. Agreement

Transmission of aperiodic legacy SRS and aperiodic additional SRS symbol(s) in the same subframes for a UE is supported.

In the UL normal subframe of the LTE TDD system up to Rel-15, both a cell-specific SRS for a specific cell and a UE-specific SRS for a specific UE may be configured only in one symbol (last symbol) in one subframe.

As described above, in the Rel-16 LTE MIMO enhancement, only the aperiodic SRS in the additional SRS of the UL normal subframe is preferentially supported.

Additional SRS (additional SRS) is different from the purpose of legacy SRS.

Legacy SRS is utilized for several purposes. Specifically, the purposes of the legacy SRS include:

obtaining UL CSI for UL scheduling or obtaining UL link adaptation or DL CSI for DL scheduling utilizing DL/UL reciprocity On the other hand, unlike legacy SRS, additional SRS may be seen as an SRS mainly targeting obtaining DL information of each cell using DL/UL reciprocity in a single serving cell or multi-cell (CA environment).

Unlike legacy SRS, which is transmitted only in the last symbol of the conventional UL normal subframe, the additional SRS may be transmitted through multiple symbols in a symbol position other than the last symbol. Therefore, according to the configuration of the additional SRS, the PUSCHs and the PUCCHs of the UE transmitting the SRS in the time domain and other UEs than the corresponding UE may collide. Further, in the case of the ULE transmitting the SRS, there is a possibility that the SRS of the UE and the PUSCH and PUCCH transmitted by the UE collide. In particular, if the UE's HARQ ACK/NACK feedback for downlink (DL) data collides with the above additional SRS, downlink throughput degradation occurs.

To prevent the above-mentioned occasions, a method for dividing subframes into two types may be considered. Specifically, by reusing the HARQ reference configuration concept, uplink subframes (UL subframes) may be divided into two types: a subframe dedicated to DL HARQ feedback and a subframe in which the additional SRS may be transmitted. Accordingly, the DL HARQ feedback and additional SRS are fundamentally avoided from collision. However, even in this case, if the feedback (e.g., PHICH) of the base station for the downlink data (UL data) of the UE comes down as a NACK, the retransmission timing of the uplink data (UL data) is rendered to belong to the subframe in which the additional SRS may be transmitted, so that the UL retransmission and the additional SRS may collide. A UE operation in this case is proposed.

A UE to which at least one proposed operation of the proposals in the disclosure is applied is referred to as an "enhanced UE" for convenience. As an example, a case of configuring/applying/transmitting the additional SRS, such as a Rel-16 UE, is included.

Further, unless mentioned otherwise in the disclosure, additional SRS means both a periodically scheduled additional SRS (periodic additional SRS) and an aperiodically scheduled aperiodic additional SRS (aperiodic additional SRS). However, if additional trigger/triggering is mentioned, additional SRS may be limited as meaning aperiodic additional SRS.

Hereinafter, matters related to embodiment 1 are described.

[Method 1]

Hereinafter, a DL/UL HARQ operation between a base station and a UE when a HARQ reference configuration is utilized in an additional SRS is described.

In case an additional SRS configured/indicated to a certain UE collides with the PUCCH and PUSCH of the corresponding UE, the base station and the UE may operate as follows.

The base station may configure the UE with a DL HARQ feedback (e.g., PUCCH) dedicated uplink subframe (UL subframe) through DL HARQ reference configuration. It may be configured to prohibit transmission of additional SRS of the enhanced UE (even when additional SRS is scheduled in the corresponding subframe, the UE does not transmit the corresponding SRS) in the corresponding uplink subframe (UL subframe). Thus, collision of additional SRS and DL HARQ feedback (e.g., PUCCH) in the enhanced UE may be prevented.

In other words, as uplink subframes (UL subframes) are divided into two types, a subframe dedicated to DL HARQ feedback and a subframe in which additional SRS may be transmitted, DL HARQ feedback (e.g., PUCCH) and additional SRS (additional SRS) are fundamentally prevented from collision.

Apart therefrom, a PUSCH scheduled by the base station may be scheduled in both the two types of subframes, a subframe dedicated to DL HARQ feedback and a subframe in which additional SRS may be transmitted. In this case, collision of additional SRS and the PUSCH may be prevented at the discretion of the base station (eNB).

However, the corresponding PUSCH may be retransmitted due to transmission failure. In this case, the number of cases in which a collision between the retransmission PUSCH and an additional SRS may occur increases, so that the range in which collision may be prevented may be exceeded at the discretion of the base station.

Methods for preventing collision are suggested below.

[Proposal 1]

When the DL/UL configuration configured in a cell (via SIB) is 1/2/3/4/5, the UE/base station may operate according to at least one of the following proposals 1-1 to 1-2.

[Proposal 1-1]

When the PUSCH is transmitted through the first uplink subframe, the UE may operate based on option 1 below.

The first uplink subframe may be based on at least one of i) and ii) below.

i) A UL subframe on DL HARQ reference configuration ii) A subframe in which additional SRS transmission is not configured/indicated among uplink subframes that are not dedicated to DL HARQ feedback.

The PUSCH may include all types of PUSCHs including an initially transmitted PUSCH (hereinafter, initial PUSCH) and retransmission for a previously transmitted PUSCH (hereinafter, PUSCH transmitted when the UE decodes PHICH and receives a NACK after initial PUSCH transmission) (hereinafter, retransmission PUSCH).

Option 1. The UE may operate by detecting/receiving a physical HARQ indicator channel (PHICH) for the corresponding PUSCH (same as conventional) and reflecting/applying it to retransmission of the corresponding PUSCH.
[Proposal 1-2]

When the PUSCH is transmitted through the second uplink subframe, the UE may operate based on any one of options 2 to 4 below.

The second uplink subframe may be based on at least one of i) and ii) below.

i) A subframe other than the UL subframe on DL HARQ reference configuration ii) A subframe in which additional SRS transmission is configured/indicated among uplink subframes that are not dedicated to DL HARQ feedback.

Here, the PUSCH may include all types of PUSCHs including an initially transmitted PUSCH (hereinafter, initial PUSCH) and retransmission for a previously transmitted PUSCH (e.g., PUSCH transmitted when the UE decodes PHICH and receives a NACK after initial PUSCH transmission) (hereinafter, retransmission PUSCH).

Option 2. The UE may operate not to detect/receive PHICH for the corresponding PUSCH (and/or operate assuming that the corresponding PHICH is ACK).

Option 3. The UE may operate not to detect/receive PHICH for the corresponding PUSCH (and/or operate assuming that the corresponding PHICH is ACK). The UE may determine whether to retransmit the corresponding PUSCH based on the new data indicator (NDI) or HARQ process number of the UL DCI received from the base station. Specifically, if the content of the PHICH is NACK (if transmission of the initial PUSCH fails), the base station newly schedules a PUSCH for the corresponding UE (e.g., using a new data indicator of UL DCI or HARQ process number) and induces retransmission in an uplink subframe (UL subframe) on the DL HARQ reference configuration.

Option 4. The ULE operates according to option 1 for the corresponding PUSCH, but if the retransmission PUSCH and additional SRS transmission are indicated/configured in the same UL subframe, it may drop PUSCH transmission while only performing additional SRS transmission. In other words, transmission of additional SRS has a higher priority than retransmission of PUSCH.

Even if the frequency domain resource allocated for the retransmission PUSCH does not overlap the frequency domain resource allocated for the additional SRS, if each transmission is configured in the same uplink subframe, the UE may operate according to option 4 above.
[Proposal 2]

When the DL/UL configuration configured in a cell (via SIB) is 0/6, the UE/base station may operate according to any one of the options of the following proposal 2-1.
[Proposal 2-1]

When the PUSCH is transmitted through an arbitrary subframe, the UE/base station may operate according to any one of options 2 to 4 below. Here, the PUSCH may include all types of PUSCHs including an initially transmitted PUSCH (hereinafter, initial PUSCH) and retransmission for a previously transmitted PUSCH (e.g., PUSCH transmitted when the UE decodes PHICH and receives a NACK after initial PUSCH transmission) (hereinafter, retransmission PUSCH).

Option 2. The UE may operate not to detect/receive PHICH for the corresponding PUSCH (or operate assuming that the corresponding PHICH is ACK).

Option 3. The UE may operate not to detect/receive PHICH for the corresponding PUSCH (or operate assuming that the corresponding PHICH is ACK) and may determine whether to retransmit the corresponding PUSCH based on the NDI (New data indicator) or HARQ process number of the UL DCI received from the base station. Specifically, if the content of the PHICH is NACK (if transmission of the initial PUSCH fails), the base station newly schedules a PUSCH for the corresponding UE (e.g., using a new data indicator of UL DCI or HARQ process number) and induces retransmission in an uplink subframe (UL subframe) on the DL HARQ reference configuration.

Option 4. The ULE operates according to option 1 for the corresponding PUSCH, but if the retransmission PUSCH and additional SRS transmission are indicated/configured in the same UL subframe, it may drop PUSCH transmission while only performing additional SRS transmission. In other words, transmission of additional SRS has a higher priority than retransmission of PUSCH.

Even if the frequency domain resource allocated for the retransmission PUSCH does not overlap the frequency domain resource allocated for the additional SRS, if each transmission is configured in the same uplink subframe, the UE may operate according to option 4 above.
[Proposal 3]

Regardless of the DL/UL configuration configured in a certain cell (via SIB), the UE/base station may operate as follows.

When the additional SRS triggered by the base station in an arbitrary subframe collides with the retransmission PUSCH (transmitted by the UE decoding the PHICH and receiving the NACK after initial PUSCH transmission), the UE may drop transmission of the additional SRS while only performing PUSCH retransmission. In other words, retransmission PUSCH has a higher priority than the additional SRS. Specifically, if the ULE detects the PHICH after initial PUSCH transmission, the HARQ process for retransmitting UL data (retransmission PUSCH) takes precedence over the additional SRS.

Even if the frequency domain resource allocated for the retransmission PUSCH does not overlap the frequency domain resource allocated for the additional SRS, if each transmission is configured in the same uplink subframe, the UE may operate according to proposal 3 above.

The proposal of method 1 is not limited to one component carrier (CC) or one band and may also be applied to intra-band carrier aggregation or inter-band carrier aggregation (inter-band CA). With option 4 of proposals 1 and 2, e.g., if PUSCH retransmission that may occur in a certain CC and additional SRS configured in another CC occur at the same time, the additional SRS may have higher priority than retransmission PUSCH.

A specific embodiment related to the above-mentioned proposal 1 is described below.

In the case of TDD configuration 2 configured in the cell, the configuration of each subframe is shown in Table 3 below.

TABLE 3

| SF#0 | #1 | #2 | #3 | #4 | #5 | #6 | #7 | #8 | #9 |
|------|-----|-----|-----|-----|-----|-----|-----|-----|-----|
| DL | SSF | UL | DL | DL | DL | SSF | UL | DL | DL |

(DL: downlink subframe, UL: uplink subframe, SSF: special subframe)

Referring to Table 3, it is assumed that the uplink normal subframe of SF #2 becomes the DL HARQ feedback (PUCCH) dedicated SF according to the DL HARQ reference configuration of the corresponding cell. Where the PUSCH is scheduled in SF #2,the ULE performs UL HARQ operation as in option 1 above. On the other hand, if the PUSCH is scheduled in SF #7, the ULE performs UL HARQ operation according to any one of options 2 to 4.

[Method 2]

A method for preventing collision between additional SRS and other UL channels (e.g., PUCCH or PUSCH) through configuration/indication of subframe(s) in which the additional SRS is transmittable by the base station or subframe(s) that prioritize the additional SRS and the UE's operation according to the method are described below.

Specifically, method 2 proposes a method for preconfiguring subframe(s) capable of transmitting additional SRS and/or subframe(s) that prioritize additional SRS. Further, method 2 proposes methods for preventing collision between an additional SRS and another uplink channel (UL channel) and resolving ambiguity in operation in UE operation.

[Proposal 1]

The base station may configure/indicate the UE with an 'additional SRS transmittable subframe set'. The corresponding UE operates so that additional SRS transmission timing is always included in the set subframe set.

In other words, after additional SRS triggering through DL/UL DCI transmission of the base station, the UE may not transmit additional SRS in any subframe. In other words, the UE may transmit additional SRS only in subframes belonging to the 'additional SRS transmittable subframe set'. The above 'additional SRS transmittable subframe set' may be one set or a plurality of set(s) and may be indicated/updated through RRC configuration, and among them, a specific set may be indicated/updated through the n bit field of MAC CE or DCI.

[Proposal 1-1]

When the base station triggers an additional SRS to the UE through the DL grant DCI, the UE may operate as follows.

If additional SRS transmission is triggered through DL grant DCI in subframe n, the UE may determine a subframe for transmitting additional SRS as i), ii) or iii) below.

i) subframe n+4 ii) the earliest candidate additional SRS subframe after the subframe n+4 iii) (if a separate candidate subframe is not configured) the earliest UL subframe after the subframe n+4

[Proposal 1-2]

When the base station triggers an additional SRS to the UE through the UL grant DCI, the UE may operate as follows.

If additional SRS transmission is triggered through UL grant DCI in subframe n, the UE may determine a subframe for transmitting additional SRS as i) or ii) below.

i) the earliest candidate additional SRS subframe after the PUSCH transmission subframe scheduled from the DCI ii) (if a separate candidate subframe is not configured) the earliest uplink subframe after the PUSCH transmission subframe scheduled from the DCI In proposals 1-1 and 1-2, the earliest candidate additional SRS subframe denotes the earliest subframe among the subframe(s) in the 'additional SRS transmittable subframe set'.

[Proposal 2]

The base station configures/indicates the UE with an 'additional SRS transmittable subframe set'. The transmission timing of the subsequent additional SRS follows the legacy aperiodic SRS (legacy AP-SRS) transmission timing (transmission in an uplink subframe (UL subframe) after n+4 if the trigger time is n).

If the additional SRS collides with another uplink channel (UL channel) (e.g., PUCCH, PUSCH, SRS for other cell) in the same subframe in one cell, the UE may determine whether to prioritize the additional SRS depending on whether the subframe is the additional SRS prioritized subframe.

In other words, if the additional SRS collides with another UL channel,

1) When the corresponding subframe is the additional SRS prioritized subframe, the UE prioritizes additional SRS and transmits additional SRS.

2) When the corresponding subframe is not the additional SRS prioritized subframe, the UE prioritizes other UL channels and transmits another UL channel according to the conventional priority rule (e.g., LTE priority rule). In this case, all symbols may be dropped for non-prioritized channels (i.e., the remaining UL channels except for the transmitted UL channel among the UL channels colliding in the corresponding subframe).

The above 'subframe set to prioritize additional SRS' may be preconfigured through RRC configuration and may be indicated/updated through the n bit field of MAC CE or DCI. Alternatively, for more dynamic change of the priority rule, DCI triggering additional SRS may include a separate 1-bit field. Whether additional SRS has higher priority than other UL channels may be indicated to the UE through the 1-bit field of the DCI.

For example, when an additional SRS collides with another UL channel, if the 1-bit field of the DCI is '1', the UE may perform transmission while prioritizing the additional SRS than other UL channels in the subframe in which the additional SRS is triggered. Conversely, if the 1-bit field of the DCI is '0', the UE may consider that other UL channels are prioritized over additional SRS in the corresponding subframe and transmit another UL channel.

The base station-UE operations may be based on at least one of proposal 1 or proposal 2 of method 2 described above. In other words, proposal 1 or proposal 2 may be independently applied or a combination of proposal 1 and proposal 2 may be applied in the base station-UE operation.

The proposal of method 2 is not limited to one component carrier (CC) or one band and may also be applied to intra-band carrier aggregation or inter-band carrier aggregation (inter-band CA).

Hereinafter, the UE operation of the method 1 and method 2 may be expressed as the following example.

An example of a UE operation based on method 1 is as follows.

Step 0) receives SRS configuration

Step 0-1) receives configuration to transmit SRS in one or more symbol

Step 0-1-1)—information that may be included in the configuration is (36.331 SoundingRS-UL-Config)

Step 0-2) transmits SRS periodically or aperiodically

Step 1) receives UL grant (through PDCCH)

Step 1-0) UL grant includes PUSCH scheduling information

Step 1-1) may receive DCI (UL/DL) triggering additional SRS separately from the UL grant for scheduling PUSCH (additional SRS may be aperiodic (in one time instance)).

Step 2) transmits PUSCH based on UL grant

Step 3) receives ACK/NACK for PUSCH in step 2 through PHICH

Step 4) UL HARQ operation according to TDD UL/DL configuration
    Step 4-1) When TDD UL/DL configuration is 1/2/3/4/5
    Step 4-1-1) Option 1 of proposal 1-1
    Step 4-1-2) Option 2/option 3/option 4 of proposal 1-2
    Step 4-2) When TDD UL/DL configuration is 0/6
    Step 4-2-1) Option 2/option 3/option 4 of proposal 2-1
    Step 4-3) Regardless of TDD UL/DL configuration
    Step 4-3-1) Proposal 3
    An example of a UE operation based on method 2 is as follows.
    Step 0) receives SRS configuration
    Step 0-1) receives configuration to transmit SRS in one or more symbol
    Step 0-1-1)—information that may be included in the configuration is (36.331 SoundingRS-UL-Config)
    Step 0-2) SRS may be transmitted periodically or aperiodically
    Step 1) receives DL/UL DCI (through PDCCH)
    Step 1-1) When additional SRS is triggered through DL DCI
    Step 1-1-1) Proposal 1-1
    Step 1-2) When additional SRS is triggered through UL DCI
    Step 1-2-1) transmits additional SRS after PUSCH transmission as in proposal 1-2
    Another example of a UE operation based on method 2 is as follows.
    Step 0) receives SRS configuration
    Step 0-1) receives configuration to transmit SRS in one or more symbol
    Step 0-1-1)—information that may be included in the configuration is (36.331 SoundingRS-UL-Config)
    Step 0-2) SRS may be transmitted periodically or aperiodically
    Step 1) receives DL/UL DCI (through PDCCH) and triggers additional SRS
    Step 2) When additional SRS to be transmitted at the uplink subframe after n+4 if the trigger time is n and other UL channels collide
    Step 2-1) Proposal 2

Not all of the above steps are essential, and some steps may be omitted depending on the situation of the UE.

The effects of the above-described methods 1 and 2 are described below in detail.

<For Method 1>

Proposal 1 proposes a method for preventing collision between the retransmission PUSCH and the additional SRS in a case where the DL/UL configuration configured in a certain cell (via SIB) is 1/2/3/4/5.

In this case, since the PUSCH-to-retx PUSCH (RTT) of the PUSCH is 10 ms, retransmission for PUSCH transmission in the UL SF index X is performed through the same SF index X after 10 ms. Therefore, if the PUSCH is transmitted through the UL subframe on the DL HARQ reference configuration, the retransmission PUSCH and additional SRS are unlikely to collide, so the operation of the UE follows option 1.

On the other hand, if the PUSCH is transmitted through a subframe other than the UL subframe on the DL HARQ reference configuration, there is a possibility that the retransmission PUSCH and additional SRS collide. The UE may operate according to options 2 to 4 to solve the collision problem.

In the case of proposal 2, if the DL/UL configuration configured in a cell (via SIB) is 0/6, the PUSCH-to-retx PUSCH (RTT) of the PUSCH is not 10 ms, so it is not that the possibility of collision is varied depending on whether the subframe in which the PUSCH is transmitted is an uplink subframe on the DL HARQ reference configuration. In other words, there is always a possibility of collision between the retransmission PUSCH and an additional SRS. Even in this case, the UE may operate according to options 2 to 4 to solve the collision problem.

In the case of proposal 3, it is assumed that the PUSCH initially scheduled by the base station and additional SRS triggered by the base station are controlled not to collide at the base station's discretion. Specifically, proposal 3 proposes a method for controlling collision under the assumption that the initial PUSCH transmitted by the UE fails in transmission and, when retransmitted, has a chance of colliding with the additional SRS triggered by the base station. Proposal 3 defines a UE operation when the importance of a PUSCH carrying data or a retransmission PUSCH is higher than transmission of an additional SRS for obtaining DL CSI.

<For Method 2>

In proposals 1 and 2, subframe(s) capable of transmitting additional SRS and subframe(s) that prioritize additional SRS are preconfigured. As the transmission timing of an additional SRS is defined in the UE operation through the above configuration, collision between the additional SRS and other UL channels may be prevented and ambiguity in operation may be removed.

Hereinafter, matters related to embodiment 2 are described.

[Method 3]

Hereinafter, in a carrier aggregation (CA) situation, collision between the additional SRS and PUSCH and between SRSs is described.

Conventionally in LTE up to Rel-15, if SRS and PUSCH collide in one serving cell or if SRS and PUSCH transmitted on different serving cells collide, PUSCH had high priority and SRS was dropped.

Further, if SRS and PUSCH are scheduled simultaneously (e.g., in the same subframe) on different serving cells in a CA situation according to the capability of the UE, if the sum of SRS and PUSCH transmission power does not exceed the maximum transmission power of the UE, SRS and PUSCH of different cells may be simultaneously transmitted and, if the sum of the SRS and PUSCH transmission power exceeds the maximum transmission power of the corresponding UE, the PUSCH is prioritized, and the SRS power is clipped or scaled down, so that simultaneous transmission is performed or the SRS itself is dropped.

Hereinafter, the UE operation related to collision between additional SRS and PUSCH in the CA situation of the enhanced UE in Rel-16 or its subsequent releases is described.

[Proposal 1]

In a single serving cell situation or a CA situation of the UE, if an additional SRS and a PUSCH are simultaneously scheduled (e.g., in the same subframe) on the same serving cell and a collision occurs at the same time, the UE puts higher priority on the additional SRS and drops the PUSCH and transmits the additional SRS.

Further, if an additional SRS and a PUSCH are scheduled simultaneously (e.g., in the same subframe) on different serving cells in a CA situation and collision occurs at the same time point, the UE puts a high priority on the PUSCH, dropping the additional SRS and transmitting the PUSCH.

[Proposal 2]

According to the performance of the UE for the maximum transmit power, if additional SRS and PUSCH are scheduled simultaneously (e.g., in the same subframe) on different serving cells in a CA situation, and collision occur at the same time, the UE may operate as follows.

1) If the sum of additional SRS and PUSCH transmission power does not exceed the maximum transmission power of the corresponding UE, additional SRS and PUSCH of different cells are simultaneously transmitted. 2) If the sum of the additional SRS and PUSCH transmission power exceeds the maximum transmission power of the corresponding UE, a high priority is placed on the additional SRS, and the PUSCH transmission power is scaled down, so that they are transmitted subscriber identity module, or the PUSCH is dropped.

Further, whether simultaneous transmission of the additional SRS and PUSCH is possible may be defined as one of UE capabilities, and the UE may report the corresponding capability information to the base station. The base station may configure/indicate, to the UE, whether the simultaneous transmission is possible, and if simultaneous transmission is possible according to the corresponding configuration/indication (even by scaling down the transmission power of the PUSCH), the UE may simultaneously transmit the additional SRS and PUSCH and, if simultaneous transmission is impossible, it may drop the PUSCH itself.

[Proposal 3]

In the CA situation of the UE, if an additional SRS and an SRS of UpPTS are configured/indicated at the same time (e.g., in the same subframe) on different serving cells and a collision occurs, the UE prioritizes the additional SRS and transmits the additional SRS.

Alternatively, the UE may compare the number of symbols of the additional SRS related to the collision with the number of symbols of the SRS of the UpPTS and may transmit the one with more symbols while dropping the other with fewer symbols. When each SRS has the same number of symbols, the UE may transmit the additional SRS and drop the SRS of the UpPTS. Alternatively, the UE may transmit the SRS of the one with the higher priority (PCell>PSCell>SCell, and/or MCG>SCG) of cell/cell group having the same number of symbols while dropping the SRS of the other with the lower priority.

Further, in a case where additional SRSs are configured/indicated at the same time (e.g., in the same subframe) on different serving cells in the CA situation of the UE and collision occurs, the UE may transmit the additional SRS of the one having the higher priority (PCell>PSCell>SCell, and/or MCG>SCG) of cell/cell group while dropping the additional SRS of the other. Alternatively, the UE may compare the number of symbols of additional SRSs related to the collision and drop the one with fewer symbols.

In collision between the additional SRS and the SRS of UpPTS on different serving cells and collision between the additional SRSs on different serving cells, whether simultaneous transmission of the two entities (additional SRS and SRS of UpTPS) is possible may be defined as a separate UE capability, and the UE may report the capability information to the base station. If the sum of the transmission powers of the two colliding entities in the UE capability does not exceed the maximum transmission power of the corresponding UE, the two entities of different cells may be simultaneously transmitted and, if the sum of the transmission powers of the two colliding entities exceeds the maximum transmit power of the corresponding UE, the transmission power of the entity deprioritized according to the priority rule of proposal 3 may be scaled down, and they may be simultaneously transmitted or the corresponding entity itself may be dropped.

Further, the base station may configure/indicate, to the UE, whether simultaneous transmission of these two entities is possible.

The base station-UE operations may be based on at least one of proposal 1, proposal 2, or proposal 3 of method 3 described above. Proposal 1/proposal 2/proposal 3 may be independently applied to the operation between the base station and the IE or a combination of two or more thereof may be applied thereto.

An example of a UE operation based on method 3 is as follows.

Step 0) receives SRS configuration

Step 0-1) receives configuration to transmit SRS in one or more symbol

Step 0-1-1)—information that may be included in the configuration is (36.331 SoundingRS-UL-Config)

Step 0-2) SRS may be transmitted periodically or aperiodically

Step 1) receives DL/UL DCI (through PDCCH) and triggers additional SRS

Step 2) When additional SRS to be transmitted at the uplink subframe after n+4 if the trigger time is n and other UL channels/RSs collide Step 2-1) When collision occurs due to simultaneous scheduling of additional SRS and PUSCH on the same serving cell in a single serving cell situation or CA situation of the UE->proposal 1

Step 2-2) When collision occurs due to simultaneous scheduling of additional SRS and PUSCH on different serving cells in the CA situation->proposal 2

Step 2-3) When collision occurs due to simultaneous configuration/indication of additional SRS and SRS of UpPTS on different serving cells in the CA situation->proposal 3

Not all of the above steps are essential, and some steps may be omitted depending on the situation of the UE.

The effects of the above-described method 3 are described below in detail.

Proposal 1 defines an operation in which upon additional SRS/PUSCH collision on the same serving cell in a single serving cell or CA situation of the UE, the UE drops the PUSCH and, if a collision between different cells occurs, the UE drops the SRS. For collisions on the same serving cell, the base station configures/indicates additional SRS to obtain DL information. However, the case is regarded as an error case in which collision with PUSCH occurs, providing an effect that clearly defines a UE operation and removes ambiguity. Further, in case of collision between different cells, PUSCH transmission may be protected by prioritizing information (data, DL HARQ feedback, etc.) carried on the PUSCH like in conventional LTE.

In Proposal 2, if additional SRS and PUSCH are simultaneously configured/indicated on different serving cells in a CA situation, ambiguity of UE operation may be resolved. For this purpose, unlike in conventional LTE, simultaneous transmission and dropping rules are defined by prioritizing additional SRS for obtaining information for DL scheduling or obtaining DL CSI information.

Proposal 3 has an effect of resolving ambiguity in the operation of the UE when the additional SRS and the SRS of the UpPTS collide when each cell has a different TDD configuration in the CA situation of the UE. Further, ambiguity in UE operation in the case of collision between additional SRSs on different serving cells may be resolved. For example, in a case where the additional SRS of 13 symbols (symbol indexes 0 to 12) collides with the SRS of UpPTS of the last 2 symbols (symbol indexes 12 and 13), dropping the additional SRS due to one overlapping symbol may be seen as waste in terms of resource utilization. Proposal 3 defines a dropping rule according to the number of symbols, so resource utilization may be enhanced.

In terms of implementation, operations (e.g., operations related to transmission of an uplink signal based on at least one of method 1, method 2, and method 3) of the base station/UE according to the above-described embodiments may be processed by the device (e.g., the processors 102 and 202 of FIG. 13) of FIGS. 12 to 16 described below.

Further, operations (e.g., operations related to transmission of an uplink signal based on at least one of method 1, method 2, and method 3) of the base station/UE according to the above-described embodiment may be stored in a memory (e.g., 104 or 204 of FIG. 13) in the form of instruction/program (e.g., instructions, executable codes) for driving at least one processor (e.g., 102 or 202 of FIG. 13).

FIG. 9 is a flowchart for describing the operation of a UE to which a method proposed in the disclosure may be applied. FIG. 9 is intended merely for illustration purposes but not for limiting the scope of the disclosure.

Referring to FIG. 9, it is assumed that the UE performs uplink transmission (e.g., UL channel, additional SRS, etc.) based on the schemes described in method 1, method 2 and/or method 3 of embodiment 1 described above.

The UE may receive an SRS configuration from, e.g., the base station (S910). For example, as in step 0 of method 1), step 0 of method 2), and step 0 of method 3), the UE may receive the SRS configuration including information related to transmission of the SRS (e.g., additional SRS, UpPts SRS).

The UE may receive DCI related to transmission of, e.g., the SRS and/or UL channel (S920). For example, the corresponding DCI may correspond to the DL/UL DCI (e.g., DCI described in operation 1) in methods 1 to 3 described above.

Thereafter, the UE may transmit SRS and/or UL channel (s) based on the received SRS configuration, DCI, and/or pre-defined rules (e.g., priority rule) (S930). DCI may include information related to the additional SRS and, in this case, the additional SRS may be transmitted aperiodically (in one time instance).

As an example, if a collision occurs between the additional SRS and another UL channel(s)/another type of SRS (e.g., UpPTS SRS), the UE may transmit the SRS and/or UL channel(s) according to the rules (e.g., specifically, step 5 of method 1) described in the above-described methods 1 to 3, steps 1-1/1-2 of proposal 1 of method 2, step 2 of proposal 2 of method 2, and/or step 2 of method 3.

The above-described embodiments are described below in detail with reference to FIG. 10 in terms of the operation of the UE. Further, the embodiments and/or methods described in the disclosure are differentiated solely for ease of description, and some components in any one method may be replaced, or combined with components of another method.

FIG. 10 is a flowchart illustrating a method for transmitting a physical uplink shared channel by a UE according to an embodiment of the disclosure.

Referring to FIG. 10, a method for a UE to transmit a physical uplink shared channel (PUSCH) according to an embodiment of the disclosure may include the steps of receiving SRS configuration information (S1010), receiving DCI (S1020), transmitting a first PUSCH (S1030), and transmitting a second PUSCH (S1040).

In S1010, the UE receives configuration information related to a sounding reference signal (SRS).

According to an embodiment, the SRS is configured in an area other than a specific subframe in a radio frame, the area composed of at least one symbol other than a last symbol of the subframe. The SRS may be an additional SRS.

According to an embodiment, the specific subframe may be a dedicated subframe configured to transmit downlink HARQ feedback. The specific subframe may be a DL HARQ feedback-dedicated subframe based on a DL HARQ reference configuration.

The operation of receiving configuration information related to the sounding reference signal (SRS) by the UE (100/200 of FIGS. 12 to 16) from the base station (100/200 of FIGS. 12 to 16) according to S1010 described above may be implemented by the device of FIGS. 12 to 16. For example, referring to FIG. 13, one or more processors 102 may control one or more transceivers 106 and/or one or more memories 104 to receive the configuration information related to the sounding reference signal (SRS) from the base station 200.

In S1020, the UE receives downlink control information (DCI) for scheduling a first PUSCH.

The operation of receiving downlink control information (DCI) to schedule a first PUSCH by the UE (100/200 of FIGS. 12 to 16) from the base station (100/200 of FIGS. 12 to 16) according to S1020 described above may be implemented by the device of FIGS. 12 to 16. For example, referring to FIG. 13, one or more processors 102 may control one or more transceivers 106 and/or one or more memories 104 to receive, from the base station 200, the downlink control information (DCI) to schedule the first PUSCH.

In S1030, the UE transmits the first PUSCH to the base station based on the DCI.

The operation of transmitting the first PUSCH to the base station (100/200 of FIGS. 12 to 16) by the UE (100/200 of FIGS. 12 to 16) according to S1030 described above may be implemented by the device of FIGS. 12 to 16. For example, referring to FIG. 13, one or more processors 102 may control one or more transceivers 106 and/or one or more memories 104 to transmit the first PUSCH to the base station 200 based on the DCI.

In S1040, the UE transmits a second PUSCH to the base station. The transmission of the second PUSCH is a retransmission of the first PUSCH.

According to an embodiment, the second PUSCH may be transmitted based on at least one of a position of a subframe in which the SRS is configured, a position of a subframe in which the transmission of the first PUSCH is scheduled, or a time division duplex related configuration.

According to an embodiment, the time division duplex related configuration may be based on any one of TDD configuration 1 to TDD configuration 5. In this case, the second PUSCH may be transmitted as follows.

Based on the subframe in which the transmission of the first PUSCH is scheduled being the specific subframe or being a subframe in which the SRS is not configured, the second PUSCH may be transmitted based on hybrid automatic repeat request (HARQ) feedback.

Based on the subframe in which the transmission of the first PUSCH is scheduled being not the specific subframe or being a subframe in which the SRS is configured, transmission of the second PUSCH may be based on new downlink control information (DCI). The second PUSCH may be transmitted in the specific subframe.

Based on the subframe in which the transmission of the first PUSCH is scheduled being not the specific subframe or being a subframe in which the SRS is configured, the second PUSCH may be transmitted based on hybrid automatic repeat request (HARQ) feedback. Based on the subframe in which the second PUSCH is scheduled being identical to the subframe in which the SRS is configured, the transmission of the second PUSCH may be dropped.

The above-described embodiment may be based on proposals 1-1 and 1-2 of method 1.

According to an embodiment, the time division duplex related configuration may be based on TDD configuration 0 to TDD configuration 6. In this case, the second PUSCH may be transmitted as follows.

The transmission of the second PUSCH may be dropped.

The transmission of the second PUSCH may be based on new downlink control information (DCI). Specifically, the second PUSCH may be transmitted in the specific subframe based on new downlink control information (DCI).

The second PUSCH may be transmitted based on hybrid automatic repeat request (HARQ) feedback. Based on the subframe in which the second PUSCH is scheduled being identical to the subframe in which the SRS is transmitted, the transmission of the second PUSCH may be dropped.

The above-described embodiment may be based on proposal 2-1 of method 1.

The operation of transmitting the second PUSCH to the base station (100/200 of FIGS. 12 to 16) by the UE (100/200 of FIGS. 12 to 16) according to S1040 described above may be implemented by the device of FIGS. 12 to 16. For example, referring to FIG. 13, one or more processors 102 may control one or more transceivers 106 and/or one or more memories 104 to transmit the second PUSCH to the base station 200.

The above-described embodiments are described below in detail with reference to FIG. 11 in terms of the operation of the base station. Further, the embodiments and/or methods described in the disclosure are differentiated solely for ease of description, and some components in any one method may be replaced, or combined with components of another method.

FIG. 11 is a flowchart illustrating a method for receiving a physical uplink shared channel by a base station according to another embodiment of the disclosure.

Referring to FIG. 11, a method for a base station to receive a physical uplink shared channel (PUSCH) according to another embodiment of the disclosure may include the steps of transmitting SRS configuration information (S1110), transmitting DCI (S1120), receiving a first PUSCH (S1130), and receiving a second PUSCH (S1140).

In S1110, the base station transmits configuration information related to a sounding reference signal (SRS) to the UE.

According to an embodiment, the SRS is configured in an area other than a specific subframe in a radio frame, the area composed of at least one symbol other than a last symbol of the subframe. The SRS may be an additional SRS.

According to an embodiment, the specific subframe may be a dedicated subframe configured to transmit downlink HARQ feedback. The specific subframe may be a DL HARQ feedback-dedicated subframe based on a DL HARQ reference configuration.

The operation of transmitting the configuration information related to the sounding reference signal (SRS) by the base station (100/200 of FIGS. 12 to 16) to the UE (100/200 of FIGS. 12 to 16) according to S1110 described above may be implemented by the device of FIGS. 12 to 16. For example, referring to FIG. 13, one or more processors 202 may control one or more transceivers 206 and/or one or more memories 204 to transmit the configuration information related to the sounding reference signal (SRS) to the UE 100.

In S1120, the base station transmits downlink control information (DCI) for scheduling a first PUSCH to the UE.

The operation of transmitting the downlink control information (DCI) for scheduling the first PUSCH by the base station (100/200 of FIGS. 12 to 16) to the UE (100/200 of FIGS. 12 to 16) according to S1120 described above may be implemented by the device of FIGS. 12 to 16. For example, referring to FIG. 13, one or more processors 202 may control one or more transceivers 206 and/or one or more memories 204 to transmit, to the UE 100, the downlink control information (DCI) to schedule the first PUSCH.

In S1130, the base station receives the first PUSCH based on the DCI from the UE.

The operation of receiving the first PUSCH based on the DCI from the UE (100/200 of FIGS. 12 to 16) by the base station (100/200 of FIGS. 12 to 16) according to S1130 described above may be implemented by the device of FIGS. 12 to 16. For example, referring to FIG. 13, one or more processors 202 may control one or more transceivers 206 and/or one or more memories 204 to receive the first PUSCH based on the DCI from the UE 100.

In S1140, the base station receives a second PUSCH from the UE. The transmission of the second PUSCH is a retransmission of the first PUSCH.

According to an embodiment, the second PUSCH may be transmitted based on at least one of a position of a subframe in which the SRS is configured, a position of a subframe in which the transmission of the first PUSCH is scheduled, or a time division duplex related configuration.

According to an embodiment, the time division duplex related configuration may be based on any one of TDD configuration 1 to TDD configuration 5. In this case, the second PUSCH may be transmitted as follows.

Based on the subframe in which the transmission of the first PUSCH is scheduled being the specific subframe or being a subframe in which the SRS is not configured, the second PUSCH may be transmitted based on hybrid automatic repeat request (HARQ) feedback.

Based on the subframe in which the transmission of the first PUSCH is scheduled being not the specific subframe or being a subframe in which the SRS is configured, transmission of the second PUSCH may be based on new downlink control information (DCI). The second PUSCH may be transmitted in the specific subframe.

Based on the subframe in which the transmission of the first PUSCH is scheduled being not the specific subframe or being a subframe in which the SRS is configured, the second PUSCH may be transmitted based on hybrid automatic repeat request (HARQ) feedback. Based on the subframe in which the second PUSCH is scheduled being identical to the subframe in which the SRS is configured, the transmission of the second PUSCH may be dropped.

The above-described embodiment may be based on proposals 1-1 and 1-2 of method 1.

According to an embodiment, the time division duplex related configuration may be based on TDD configuration 0 to TDD configuration 6. In this case, the second PUSCH may be transmitted as follows.

The transmission of the second PUSCH may be dropped.

The transmission of the second PUSCH may be based on new downlink control information (DCI). Specifically, the second PUSCH may be transmitted in the specific subframe based on new downlink control information (DCI).

The second PUSCH may be transmitted based on hybrid automatic repeat request (HARQ) feedback. Based on the subframe in which the second PUSCH is scheduled being identical to the subframe in which the SRS is transmitted, the transmission of the second PUSCH may be dropped.

The above-described embodiment may be based on proposal 2-1 of method 1.

The operation of receiving the second PUSCH by the base station (100/200 of FIGS. 12 to 16) from the UE (100/200 of FIGS. 12 to 16) according to S1140 described above may be implemented by the device of FIGS. 12 to 16. For example, referring to FIG. 13, one or more processors 202 may control one or more transceivers 206 and/or one or more memories 204 to receive the second PUSCH from the UE 100.

Example of Communication System Applied to Disclosure

The various descriptions, functions, procedures, proposals, methods, and/or operational flowcharts of the disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

FIG. 12 illustrates a communication system 1 applied to the disclosure.

Referring to FIG. 12, a communication system 1 applied to the disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g., relay, Integrated Access Backhaul (IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the disclosure.

Example of Wireless Device Applied to the Disclosure

FIG. 13 illustrates wireless devices applicable to the disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s)206. The processor(s)202 may receive radio signals including fourth information/signals through the transceiver(s) 106 and then store information obtained by processing the fourth information/signals in the memory(s) 204. The memory(s) 204 may be connected to the processor (s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Example of Signal Processing Circuit Applied to the Disclosure

FIG. 14 illustrates a signal process circuit for a transmission signal.

Referring to FIG. 14, a signal processing circuit 1000 may include scramblers 1010, modulators 1020, a layer mapper 1030, a precoder 1040, resource mappers 1050, and signal generators 1060. An operation/function of FIG. 14 may be performed, without being limited to, the processors 102 and 202 and/or the transceivers 106 and 206 of FIG. 13. Hardware elements of FIG. 14 may be implemented by the processors 102 and 202 and/or the transceivers 106 and 206 of FIG. 13. For example, blocks 1010 to 1060 may be implemented by the processors 102 and 202 of FIG. 13. Alternatively, the blocks 1010 to 1050 may be implemented by the processors 102 and 202 of FIG. 13 and the block 1060 may be implemented by the transceivers 106 and 206 of FIG. 13.

Codewords may be converted into radio signals via the signal processing circuit 1000 of FIG. 14. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 14. For example, the wireless devices (e.g., 100 and 200 of FIG. 13) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Example of Application of Wireless Device Applied to the Disclosure

FIG. 15 illustrates another example of a wireless device applied to the disclosure.

The wireless device may be implemented in various forms according to a use-case/service (refer to FIG. 12). Referring to FIG. 15, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 12), the vehicles (100*b*-1 and 100*b*-2 of FIG. 12), the XR device (100*c* of FIG. 12), the hand-held device (100*d* of FIG. 12), the home appliance (100*e* of FIG. 12), the IoT device (100*f* of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 15, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Example of Hand-Held Device Applied to the Disclosure

FIG. 16 illustrates a hand-held device applied to the disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 16, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 15, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

The physical uplink shared channel transmission/reception method and device in a wireless communication system according to embodiments of the disclosure provide the following effects.

When an additional SRS is configured, the retransmitted PUSCH may collide with the additional SRS. According to an embodiment of the disclosure, an SRS is configured in an area except for a specific subframe in a radio frame. The second PUSCH is transmitted based on at least one of a position of a subframe in which the SRS is configured, a position of a subframe in which the initial transmission of the first PUSCH is scheduled, or a time division duplex related configuration. Therefore, retransmission of the first PUSCH (transmission of the second PUSCH) may be performed to prevent collision with the SRS.

According to an embodiment of the disclosure, the specific subframe is a dedicated subframe configured to transmit downlink HARQ feedback. Collision between the SRS and downlink HARQ feedback is fundamentally prevented. It is possible to prevent DL throughput degradation due to the configuration of the additional SRS.

According to an embodiment of the disclosure, based on the time division duplex related configuration, the second PUSCH is dropped, transmitted based on HARQ feedback, or transmitted based on a new DCI. Therefore, retransmission of the first PUSCH (transmission of the second PUSCH) may be effectively performed depending on whether there is a possibility of collision with the SRS.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the disclosure should be determined by reasonable interpretations of the appended claims and all equivalents of the disclosure belong to the scope of the disclosure.

The invention claimed is:

1. A method performed by a user equipment (UE) in a wireless communication system, the method comprising:
  receiving configuration information related to a sounding reference signal (SRS);
  receiving downlink control information (DCI) for scheduling a first physical uplink shared channel (PUSCH);
  transmitting the first PUSCH based on the DCI; and
  transmitting a second PUSCH, wherein the SRS is configured in an area other than a specific subframe in a radio frame, the area composed of at least one symbol other than a last symbol of the specific subframe,
  wherein the transmission of the second PUSCH is a retransmission of the first PUSCH, and wherein the second PUSCH is transmitted based on at least one of a first position of a first subframe in which the SRS is configured, or a second position of a second subframe in which the transmission of the first PUSCH is scheduled,
  wherein the specific subframe is a dedicated subframe configured to transmit downlink hybrid automatic repeat request (HARQ) feedback, and
  wherein, based on the subframe in which the transmission of the first PUSCH is scheduled being not the specific subframe or being a subframe in which the SRS is configured, the transmission of the second PUSCH is dropped.

2. The method of claim 1, wherein the time division duplex related configuration is based on any one of TDD configuration 1 to TDD configuration 5.

3. The method of claim 2, wherein based on the second subframe in which the transmission of the first PUSCH is scheduled being the specific subframe or the first subframe in which the SRS is not configured, the second PUSCH is transmitted based on the downlink (HARQ) feedback.

4. The method of claim 2, wherein based on the second subframe in which the transmission of the first PUSCH is scheduled being not the specific subframe or being a first subframe in which the SRS is configured, the transmission of the second PUSCH is based on new downlink control information (DCI).

5. The method of claim 4, wherein the second PUSCH is transmitted in the specific subframe.

6. The method of claim 2, wherein based on the second subframe in which the transmission of the first PUSCH is scheduled being not the specific subframe or being the first subframe in which the SRS is configured, the second PUSCH is transmitted based on the downlink (HARQ) feedback.

7. The method of claim 6, wherein based on a third subframe in which the second PUSCH is scheduled being identical to the first subframe in which the SRS is configured, the transmission of the second PUSCH is dropped.

8. The method of claim 1, wherein the time division duplex related configuration is based on TDD configuration 0 or TDD configuration 6.

9. The method of claim 8, wherein the transmission of the second PUSCH is dropped.

10. The method of claim 8, wherein the second PUSCH is transmitted in the specific subframe based on new downlink control information (DCI).

11. The method of claim 8, wherein the second PUSCH is transmitted based on the downlink HARQ feedback, and wherein based on that a third subframe in which the second PUSCH is scheduled being identical to the first subframe in which the SRS is transmitted, the transmission of the second PUSCH is dropped.

12. A UE in a wireless communication system, the UE comprising:
  one or more transceivers;
  one or more processors; and
  one or more memories operably connectible to the one or more processors and storing instructions to, when the transmission a physical uplink shared channel (PUSCH) is executed by the one or more processors, perform operations, wherein the operations include:
  receiving configuration information related to a sounding reference signal (SRS);
  receiving downlink control information (DCI) for scheduling a first PUSCH;
  transmitting the first PUSCH based on the DCI; and
  transmitting a second PUSCH, wherein the SRS is configured in an area other than a specific subframe in a radio frame, the area composed of at least one symbol other than a last symbol of the specific subframe,
  wherein the transmission of the second PUSCH is a retransmission of the first PUSCH, and wherein the second PUSCH is transmitted based on at least one of a first position of a first subframe in which the SRS is configured, or a second position of a second subframe in which the transmission of the first PUSCH is scheduled,
  wherein the specific subframe is a dedicated subframe configured to transmit downlink hybrid automatic repeat request (HARQ) feedback, and
  wherein, based on the second subframe in which the transmission of the first PUSCH is scheduled being not the specific subframe or being the first subframe in which the SRS is configured, the transmission of the second PUSCH is dropped.

13. A method performed by a base station in a wireless communication system, the method comprising:
  transmitting configuration information related to a sounding reference signal (SRS);
  transmitting downlink control information (DCI) for scheduling a first physical uplink shared channel (PUSCH);
  receiving the first PUSCH based on the DCI; and
  receiving a second PUSCH, wherein the SRS is configured in an area other than a specific subframe in a radio frame, the area composed of at least one symbol other than a last symbol of the specific subframe, wherein the transmission of the second PUSCH is a retransmission of the first PUSCH, and wherein the second PUSCH is transmitted based on at least one of a first position of a first subframe in which the SRS is configured, or a second position of a second subframe in which the transmission of the first PUSCH is scheduled, wherein the specific subframe is a dedicated subframe configured to transmit downlink hybrid automatic repeat request (HARQ) feedback, and wherein, based on the second subframe in which the transmission of the first PUSCH is scheduled being not the specific subframe or being the first subframe in which the SRS is configured, the transmission of the second PUSCH is dropped.

* * * * *